US009067351B2

(12) United States Patent
Cloeren et al.

(10) Patent No.: US 9,067,351 B2
(45) Date of Patent: Jun. 30, 2015

(54) VARYING TRANSITION ZONE MANIFOLD

(75) Inventors: Peter F. Cloeren, Orange, TX (US); Giuseppe Negri, Rho (IT); Olivier Catherine, Orange, TX (US)

(73) Assignee: CLOEREN INCORPORATED, Orange, TX (US)

( * ) Notice: Subject to any disclaimer, the term of this patent is extended or adjusted under 35 U.S.C. 154(b) by 413 days.

(21) Appl. No.: 13/506,137

(22) Filed: Mar. 29, 2012

(65) Prior Publication Data
US 2013/0259965 A1    Oct. 3, 2013

(51) Int. Cl.
*B29C 47/14* (2006.01)
(52) U.S. Cl.
CPC ..................... *B29C 47/14* (2013.01)
(58) Field of Classification Search
CPC ........................................ B29C 47/14
USPC ............... 425/133.5, 376.1, 381, 461, 466
See application file for complete search history.

(56) References Cited

U.S. PATENT DOCUMENTS

| | | | |
|---|---|---|---|
| 3,344,473 A | 10/1967 | Achterberg et al. | |
| 3,940,221 A | 2/1976 | Nissel | |
| 3,970,417 A | 7/1976 | Page | |
| 3,988,097 A * | 10/1976 | Anders et al. | 425/192 R |
| 4,285,655 A | 8/1981 | Matsubara | |
| 4,372,739 A | 2/1983 | Vetter et al. | |
| 5,120,484 A | 6/1992 | Cloeren | |
| 5,234,649 A | 8/1993 | Cloeren | |
| 5,256,052 A | 10/1993 | Cloeren | |
| 5,451,357 A | 9/1995 | Cloeren | |
| 5,494,429 A | 2/1996 | Wilson et al. | |
| 5,505,609 A | 4/1996 | Cloeren | |
| 6,340,123 B1 | 1/2002 | Lee et al. | |
| 7,056,112 B2 | 6/2006 | Ulcej | |
| 7,862,755 B2 | 1/2011 | Elgindi | |

OTHER PUBLICATIONS

Griff, Allan L., Plastics Extrusion Technology, 1976, Robert E. Krieger Publishing Co. Inc., New York, p. 100.*
Matsubara, Polymer Engineering and Science, Feb. 1979, pp. 169-172, vol. 19, No. 3.
International Search Report & Written Opinion, PCT/US13/00091, Jun. 20, 2013.

* cited by examiner

*Primary Examiner* — Yogendra Gupta
*Assistant Examiner* — Joseph Leyson
(74) *Attorney, Agent, or Firm* — Timothy R. Kroboth

(57) ABSTRACT

The present invention provides an extrusion die that includes a manifold transition zone that comprises a varying included angle. The varying included angle provides unparalleled freedom of design to achieve diverse fluid dynamic objectives, such as reduced residence time across the manifold width, reduced transition stagnation, improved streamlining of the mass flowing through the manifold, and reduced differential clamshell deflection across the flow channel width. The manifold may be transformed from one cross-sectional shape to another cross-sectional shape beneficially related to the varying included angle, including change from a generally extended cross-sectional shape to a generally teardrop-shaped cross-section. The manifold may include a first transition zone portion that includes the varying included angle, and a second transition zone portion that includes a constant included angle, and that is particularly beneficial for receiving an internal deckle.

134 Claims, 14 Drawing Sheets

VARYING TRANSITION ZONE MANIFOLD

FIELD OF THE INVENTION

This invention relates to a slot die nozzle for forming a flowing mass to a prescribed thickness and width, particularly useful for forming polymeric films, sheets and coatings.

BACKGROUND OF THE INVENTION

Conventional extrusion dies include multi-manifold and single-manifold flow channel designs, and are illustrated by end feed dies (U.S. Pat. No. 5,234,649 to Cloeren), T-Slot dies, coathanger dies, and multi-stage preland dies (U.S. Pat. Nos. 5,234,649 and 5,256,052 to Cloeren). The specific flow channel geometries are well described, and include a flow channel comprising a transverse flow-providing manifold spanning a width, and a downstream flow channel portion.

The manifold may have a decreasing or constant cross-sectional area, and may have a variety of cross-sectional shapes, including a generally circular cross-section (U.S. Pat. No. 4,285,655 to Matsubara). Prior art FIG. 2 of Cloeren '649 illustrates a generally tear drop manifold shape, and FIG. 3 (incorporated herein by reference) of U.S. Pat. No. 5,120,484 to Cloeren illustrates a generally extended manifold shape, and in particular a generally rectangular manifold shape.

Generally transverse to the main flow direction, coathanger dies have rectilinear or curvilinear (Matsubara '655) manifold boundaries. The downstream flow channel portion provides fluid communication between the manifold and the flow channel exit orifice, and includes a transverse flow restriction zone. A transverse flow restriction zone is designed to provide a prescribed uniform, or non-uniform, mass flow distribution across the flow channel width.

The transverse flow restriction zone comprises a flow restriction gap formed by opposing preland surfaces of the downstream flow channel portion. The surfaces forming the gap may be generally parallel, or oblique, to each other, or may comprise portions generally parallel or oblique to each other, generally transverse to the main flow direction.

The flow restriction gap may be, or may not be, adjustable, or comprise an adjustable portion. A transverse flow restriction zone including an adjustable restrictor bar that extends across the flow channel width, is generally illustrated by FIG. 3 of U.S. Pat. No. 3,940,221 to Nissel and by U.S. Pat. No. 4,372,739 to Vetter.

As illustrated by the hybrid coathanger die of FIG. 1, a known prior art extrusion die 1 may be formed by die bodies 2 and 3 (partially shown), and includes a flow channel 4 that begins at a flow channel inlet 26 and ends at a flow channel exit orifice 28. An arrow at the flow channel inlet indicates the main direction of mass flow through the extrusion die. For clarity, features including the body assembly fasteners, have been omitted.

With reference to FIG. 2, a transverse flow-providing manifold 5 of flow channel 4 spans a width from within a region 15 (generally indicated) of transverse flow initiation. The flow channel inlet feeds the manifold, which has rectilinear boundaries generally transverse to the main flow direction. A boundary 65 delineates the coathanger portion of the flow channel from a wing-like (commonly known as a "gull-wing manifold") portion of the flow channel suitable for receiving an internal deckle.

Referring again to FIG. 1, the manifold is a generally tear drop-shaped manifold, and includes fillet radii $R_1$, $R_2$. As illustrated, fillet radii $R_1$, $R_2$ are spaced apart by a back wall 12 of the manifold, however when coterminous with each other, may join to form a radial back wall. Back wall 12 is the most upstream boundary of the manifold along the manifold width. With further reference to FIG. 1 and for purposes of the present invention, "H" means manifold height, "$H_T$" means manifold tangent height, "R" means manifold fillet radius, "L" means manifold length, "$L_T$" means manifold tangent length, and "$L_{FC}$" means flow channel length.

As further illustrated by FIG. 2, the functional width of manifold 5 may be reduced by internal deckles 19 in the die flow channel. The deckles may be slidably disposed to different extents in the manifold from an end of the flow channel. An end 23 of the deckle terminates transverse mass flow within the manifold. Reference is also made to U.S. Pat. No. 5,505,609 to Cloeren et al and U.S. Pat. No. 5,451,357 to Cloeren for the use of internal deckles. Otherwise, the manifold structural width generally corresponds to width W of flow channel 4.

Referring again to FIG. 1, downstream flow channel 6 includes a preland channel comprising a transverse flow restriction zone 7, and includes exit channel surfaces 8. The transverse flow prescription zone comprises a flow restriction gap 25 formed by opposing preland surfaces 62,63 of downstream flow channel 6. As illustrated, flow restriction gap 25 has a constant dimension across the flow channel width; however, as described, flow restriction gaps that dimensionally change across the flow channel width, may also be useful.

With continued reference to FIG. 1, opposing surfaces 40,42 of the manifold have a constant angular relationship to each other (indicated as angle α), along the manifold width. Manifold surfaces 40,42 intersect preland surfaces 62,63 to form a boundary 34 (shown in FIG. 2) that includes termini 41,43, respectively. Exit edges 18 are formed by the intersection of exit channel surfaces 8 with die faces 9.

As described by U.S. Pat. No. 3,344,473 to Achterberg et al, a flow stream comprises flow stream lines. With continued reference to FIG. 2, and with reference also to FIGS. 1 and 2 (incorporated herein by reference) of U.S. Pat. No. 5,234,649 to Cloeren, as generally illustrated, laminar stream lines in the manifold flow along trajectories generally transversely from region 15 of transverse flow initiation, and differ with respect to a locus of transverse flow initiation and a locus substantially ending transverse flow within the manifold.

Continuing with particular reference to FIG. 2, transverse flow of stream lines generally begins proximate to the entrance to a transverse flow-providing manifold, and the streamlines flow transversely toward opposing ends 20 of the manifold. The transverse trajectory of a laminar stream line path, from a locus of transverse flow initiation of a stream line to a locus substantially ending its transverse flow in the manifold, is prescribed by the resistance to flow imposed upon the stream line by downstream channel portion 6, including the transverse flow restriction zone 7. Under steady state conditions, the stream line paths are fully developed and stationary. Accordingly, transverse flow of each stream line begins at its own locus of transverse flow initiation within the region of transverse flow initiation, and substantially ends within the manifold at its own respective locus, as generally illustrated by selected stream lines 13, 14, 16, 17.

Locus 13 is selected within region 15 along a stream line trajectory having minimal transverse displacement from the midline of the manifold width. Locus 14 is selected within region 15 along a second stream line, and locus 17 substantially ends transverse flow of the second stream line within the manifold proximate to termination of transverse mass flow in the manifold. Locus 16 substantially ends transverse flow within the manifold of a prescribed trajectory of a third stream line flowing from region 15, and is selected between locus 13 and locus 17.

Most all, if not all, thermoplastic polymers exhibit a time/temperature dependent rate of degradation according to which the higher the temperature, the higher the rate of degradation per unit time. Some thermoplastic polymers, such as for example polyvinyl chloride (PVC) have a high sensitivity to time/temperature dependent degradation; whereas other polymers, such as for example polypropylene (PP), exhibit relatively high tolerance to time/temperature dependent degradation.

Typically, the majority of the residence time for a mass flow passing through an extrusion die, is in the die manifold. Thus, for a highly time/temperature-sensitive fluid mass, minimization of the manifold residence time, and accordingly residence time within the die flow channel, is essential to minimize time/temperature dependent degradation.

For a given mass and given flow rate, a relatively smaller manifold cross-sectional area results in a relatively greater average mass flow velocity, and thereby provides an increase of the flow velocity along stream line paths, and the mass flow exchange rate is increased, and the average residence time is relatively less. By the term "mass flow exchange rate" is meant the frequency (rate/time) at which a mass unit is replaced by another mass unit.

Accordingly, in the prior art practice of extruding highly time/temperature-sensitive polymers, the manifold cross-sectional area is typically minimized in order to increase flow velocities along stream line paths and thereby increase the mass flow exchange rate and minimize the manifold residence time, particularly at an end region of the manifold where flow velocities and mass flow exchange rates are lowest and cumulative manifold residence time is the greatest. Increasing the mass flow exchange rate comes at the opposing expense of an increase in the manifold pressure drop. Thus, experienced artisans must balance the benefit of an increased mass flow exchange rate against an increased pressure drop to determine a preferred manifold design.

A problem associated with a change of the flow direction from a main flow direction to a generally transverse direction can occur within, and proximate to, the region of transverse flow initiation as a result of flow stream entrance affects (diagrammatically illustrated as "working energy loss" in FIGS. 1-2 of U.S. Pat. No. 5,234,649 to Cloeren). Such entrance affects may cause a region of flow transition stagnation, which is generally indicated and diagrammatically illustrated by generally arched lines in FIGS. 1 and 2. Transition stagnation is characterized by relatively low specific flow rates, or stagnant flow, and may result in deleterious time/temperature dependent polymer degradation. U.S. Pat. No. 3,344,473 to Achterberg et al. describes degradation of PVC mainly in an area corresponding to the regions of transverse flow initiation and of transition stagnation.

A prior art practice for reducing the time/temperature dependent degradation associated with transition stagnation, is to provide a compound angle (aka "PVC fly cut") in the main flow direction, at the region of transverse flow initiation. This practice has been most commonly used for a coathanger-shaped flow channel.

Transition stagnation proximate to the region of transverse flow initiation, has also been reduced by elongation of the manifold by increasing the manifold length in the main flow direction. Although this solution is beneficial within and proximate to the region of transverse flow initiation, this solution may be contrary to optimizing the mass flow exchange rate and minimizing the residence time across the manifold width, and in particular in a manifold end region. As a result, degradation of a time/temperature-sensitive fluid mass can also result in a manifold end region.

With continued reference to FIGS. 1 and 2, a further problem with minimizing the manifold cross-sectional area is an increase in flow resistance which results in an increase in the pressure differential from region 15 of transverse flow initiation to ends 20 of manifold 5. An increase in pressure results in an increase of force, exerted generally perpendicular to the flow channel surfaces wetted by a fluid mass flowing through flow channel 4, and acting upon the unitary structure of the extrusion die. As a result, differential deflection of die bodies 2, 3 may occur. A die having an oblique relationship of a manifold upstream boundary 22 to the die exit orifice or having a differential wetted surface area across its width such as a coathanger die, is typically subject to more differential clamshell deflection, as compared to a die having a generally uniform wetted surface area provided by a manifold upstream boundary being generally parallel to the die exit orifice, as illustrated by FIGS. 10-13 of the Cloeren '649 patent and by FIGS. 4 and 5 of U.S. Pat. No. 5,494,429 to Wilson et al. Differential clamshell deflection of the unitary die structure negatively affects a prescribed mass flow distribution across the flow channel width.

Long felt needs of flow channel design include minimizing flow transition stagnation within and proximate to the region of transverse flow initiation, minimizing differential clamshell defection across the flow channel width, and improved streamlining of the mass flowing through the manifold, while beneficially reducing residence time in the transverse flow-providing manifold.

SUMMARY OF THE INVENTION

It is accordingly an object of the present invention to provide an improved extrusion apparatus that provides reduced transition stagnation within and proximate to the region of transverse flow initiation.

It is a further object of the present invention to provide an improved extrusion apparatus that provides reduced transition stagnation while reducing manifold residence time.

It is still a further object of the invention to provide an improved extrusion apparatus that minimizes differential clamshell defection across the flow channel width, while reducing residence time in the transverse flow-providing manifold.

It is yet a further object of the invention to provide an improved extrusion apparatus that provides increased mass flow exchange along flow stream paths across the manifold width.

It is another object of the invention to provide an improved extrusion apparatus that provides improved streamlining of the mass flowing through the manifold.

Additional objectives, benefits, and advantages of the present invention are set forth in the description of the invention and will be apparent to skilled artisans upon examination of the description or practice of the invention.

To achieve the foregoing objects and in accordance with the purpose of the present invention, as embodied and broadly described herein, there is provided an extrusion die comprising a flow channel providing fluid communication from a flow channel entrance to a flow channel exit orifice. The flow channel includes a transverse flow-providing manifold, and a downstream channel portion including the exit orifice.

The manifold spans a width and includes opposing transition surfaces having an angular relationship to each other and forming a transition zone. The opposing transition surfaces intersect surfaces of the downstream channel portion. As illustrated, the manifold spans a width from within a region of transverse flow initiation, including from the midline of the manifold width, to an end of the manifold.

As illustrated in FIG. 2 and previously described, flow stream lines flow generally transversely in the manifold from respective loci within the region of transverse flow initiation toward opposing ends of the manifold, and differ with respect to a locus substantially ending transverse flow within the manifold. Particular stream lines may be adjacent to each other or may be separated from each other by other stream lines.

Beneficially, between the midline of the manifold width and loci substantially ending transverse flow of flow stream lines within the manifold, the manifold transition zone comprises a varying included angle (designated β in this description, for clarity). The varying included angle corresponds to the angular relationship of the opposing transition surfaces, which may define, or be defined by, the varying included angle. The varying angle may be an acute angle, a right angle, an obtuse angle, or may change from one type of angle to another, for example, from an acute angle to a right angle. Change of the included angle size may be linear or non-linear transversely from the manifold midline. Related to change of the included angle, at least one of the opposing transition surfaces of the transition zone is beneficially non-planar along the manifold width.

A transition zone comprising a varying included angle in accordance with the present invention, provides greatly enhanced freedom of flow channel design to particular fluid dynamic objectives, including improved streamlining of the manifold, reduced residence time across the manifold width, increased mass flow exchange along flow stream paths across the manifold width, reduced transition stagnation, reduced pressure differential across the manifold width, and reduced differential clamshell deflection across the flow channel width. The size and shape of the manifold is typically established based upon experience and fluid dynamic objectives.

A locus substantially ending transverse flow within the manifold, may be between the manifold midline and an end region of the manifold, or may be within a manifold end region. However, for example, to provide for use of internal deckles, the angular relationship between the opposing transition surfaces of a manifold portion that may be engaged by an internal deckle, advantageously remains constant, and the manifold is beneficially a multi-stage manifold that includes a manifold portion that includes a transition zone comprising varying included angle β, and coterminous therewith, a manifold portion that includes a transition zone comprising a constant included angle (designated "α" in this description, for clarity). Thus, when a slidably disposed internal deckle is in used with an inventive multi-stage manifold that includes a transition zone portion comprising constant included angle α, an end of the slidably disposed deckle may provide an adjustable locus terminating transverse flow within the manifold.

Geometric parameters useful for defining a manifold cross-section may include height H, tangent height $H_T$, fillet radius R, length L, tangent length $L_T$, an extended length $L_E$, and an included angle (α or β). Beneficially, for a transition zone comprising varying included angle β, the included angle may vary from the manifold midline toward a manifold end. However, a multi-stage manifold in accordance with the present invention, beneficially includes a transition zone portion comprising constant included angle α. Thus, a manifold in accordance with the present invention may be defined using these geometric parameters, including β, or β and α when the manifold is a multi-stage manifold comprising constant included angle α. Depending upon design objectives, flow channel length $L_{FC}$ should also be considered.

For purposes of the present invention, the terms "manifold height", "manifold tangent height", "manifold fillet radius", "manifold length", "manifold tangent length", "manifold extended length", "flow channel length", and corresponding terms such as "height" and "length", may be understood from the Detailed Description including the drawing.

The varying included angle may be selected, or by selection of other geometric parameters useful for defining a manifold cross-section, may be derived. Thus, change of the manifold cross-section is related to geometric parameters associated with the varying included angle. Likewise, other geometric parameters useful for defining a manifold cross-section, may be selected or derived. Accordingly, there are multiple ways to define the geometry of a changing manifold cross-section associated with the varying included angle, as may be desired to meet polymer processing objectives.

The inventive varying included angle provides unparalleled freedom of design including selectively varying the manifold cross-section by changing the manifold length or tangent length independent of the tangent height; changing the tangent height independent of the manifold length or tangent length; changing the tangent height independent of the manifold height and vice-versa, changing a manifold fillet radius independent of the manifold tangent length, length or height; changing the included angle independent of the tangent height; changing a cross-sectional structural shape governed by a first set of geometric parameters to a structural shape governed by a second set of geometric parameters, independent of change to the manifold length, tangent length, tangent height, height, or a fillet radius; and including change of the transverse flow restriction gap across the flow channel width, independent of change to the tangent length. These and other features uniquely accommodate diverse fluid dynamic objectives, without compromise to structural integrity of the extrusion die.

Advantageous variations of the manifold cross-section area related to varying angle β along the manifold width, include varying height H independent of tangent height $H_T$; varying tangent height $H_T$ independent of height H; varying tangent length $L_T$ independent of tangent height $H_T$; varying a fillet radius R independent of at least one of any of height H, tangent length $L_T$ and length L; varying an extended length $L_E$ independent of either the tangent length $L_T$ or length L; varying length L independent of tangent length $L_T$, and vice-versa; and combinations thereof. The flow channel length may be related to the varying angle.

Transformation of the manifold shape from a first cross-sectional shape, to a second cross-sectional shape, is beneficially related to varying angle β, and may be accomplished independent of change to at least one of any of the tangent length $L_T$, tangent height $H_T$, a fillet radius R and length L. The flow channel length may be related to the varying angle. An advantageous manifold shape transformation is a cross-over manifold: for example, transformation of the manifold from a generally extended cross-sectional shape further comprising an extended length $L_E$, to a generally tear drop-shaped cross-section for enhancement of stream line flow corresponding to the generally teardrop shape. Depending upon the particular change in shape, the first cross-sectional shape may be governed by a first set of geometric parameters, and the second cross-sectional shape may be governed by a second set of geometric parameters.

For a cross-over manifold, the included angle may decrease toward a manifold end, and one of the opposing transition surfaces of a generally tear drop-shaped cross-section may be longer than one of the opposing transition surfaces of a generally extended cross-sectional shape, in the main flow direction. Alternatively, for a cross-over manifold, the included angle may increase toward a manifold end. Benefits include enhanced stream line flow to provide increased mass flow exchange along flow stream paths across the manifold width and in particular toward an end of the manifold, and reduced differential clamshell deflection of the extrusion die.

A multi-stage manifold may be provided comprising a first manifold portion having a varying angle β, and a second manifold portion related to constant angle α, wherein the first manifold portion cross-section changes related to varying angle β, including varying height H independent of tangent height $H_T$; varying tangent height $H_T$ independent of height H; varying tangent length $L_T$ independent of tangent height $H_T$; varying a fillet radius R independent of at least one of any of height H, tangent length $L_T$ and length L; varying an extended length $L_E$ independent of tangent length $L_T$; varying an extended length $L_E$ independent of length L; varying length L independent of tangent length $L_T$, and vice-versa; and combinations thereof. Corresponding to transition zone angles β and α, the first manifold portion and the second manifold portion have a constant, or substantially constant, length L or tangent length $L_T$, so as to advantageously provide for a transverse flow restriction zone beneficial for prescription of the mass distribution across the manifold width. In an inventive multi-stage manifold, the flow channel length may be related to the varying angle.

Change of the varying included angle with respect to a changing manifold cross-section, is beneficially related to transformation of the manifold transition zone. The included angle may decrease towards a manifold end, and at least one of the opposing transition surfaces of the manifold transition zone may increase in length in the main flow direction. Also related to transformation of the transition zone, the manifold may change from a generally extended cross-sectional shape further including an extended length $L_E$, to a generally extended cross-sectional shape including a relatively shorter extended length $L_E$. An extended manifold surface may correspond to the entirety of, or a portion of, the extended length $L_E$, depending upon, for example, whether manifold cross-section includes a fillet radius. Change of the included angle with respect to transformation of the manifold transition zone, may provide a constant, or substantially constant, length L, or as may be selected or derived, may provide a constant, or substantially constant, tangent length $L_T$. Benefits of an extended manifold length include reduced transition stagnation beneficial to multilayer coextrusion, reduced manifold residence time, and reduction in differential clamshell deflection.

With respect to a changing manifold cross-section related to the varying included angle, intersection of one of the opposing transition surfaces and a surface of the downstream channel portion forms a boundary common to the manifold and the downstream channel portion across the manifold width, and the varying included angle comprises a plurality of vertices that also define a boundary. The boundary common to the manifold and the downstream channel portion may be parallel or oblique to an upstream boundary of the transverse flow restriction zone of the downstream channel portion. The boundary defined by the vertices may be generally parallel or oblique to an exit edge of the flow channel. When the flow channel length $L_{FC}$ is uniform or substantially uniform across the flow channel width, the common boundary may be parallel or generally parallel to the exit edge. As the varying included angle changes, the manifold cross-sectional area also changes and the common boundary may remain parallel or generally parallel to the manifold back line.

The transverse flow restriction zone is beneficially designed to provide a prescribed mass flow distribution transverse to the main flow direction. The prescribed mass flow distribution may be selected to be a substantially uniform mass flow distribution or a non-uniform mass flow distribution. The transverse flow restriction zone may be a single stage flow restriction zone or a multi-stage flow restriction zone, and may or may not comprise an adjustable gap.

The transverse flow restriction zone may have a varying gap generally transverse to the main flow direction. As the gap changes, the location of the common boundary changes, and the tangent length may change, or may remain constant, corresponding to the varying gap. An adjustable restrictor bar may form the varying gap.

The transverse flow-providing manifold may have a generally teardrop-shaped cross-section, or a generally extended cross-sectional shape including a generally rectangular cross-section, or any other shape comprising opposing transition surfaces having an angular relationship to each other and forming a transition zone comprising a varying included angle. The transverse flow restriction zone may be a linear coathanger type, a non-linear coathanger type, a rectilinear type, or other variations known or developed. There are unlimited combinations of such transverse flow-providing manifolds comprising a varying included angle, and of transverse flow restriction zones that may be designed without departing from the spirit or essential attributes of the invention.

Additional advantages and beneficial features of the present invention are set forth in the drawing and detailed description, and in part will become apparent to those skilled in the art upon examination of the drawing and detailed description, or may be learned by practice of the invention. In the drawing and detailed description, there are shown and essentially described several embodiments of this invention, simply by way of illustration of the invention. As described and will be realized, this invention is capable of other modifications in various respects, all without departing from the invention. Accordingly, the drawing and the detailed description are to be regarded as illustrative in nature, and not as restrictive.

BRIEF DESCRIPTION OF THE DRAWING

Reference is now made to the accompanying drawing which forms a part of the specification of the present invention, and which beginning with FIG. 3 illustrates embodiments in accordance with the present invention. For clarity, certain features have been omitted.

DETAILED DESCRIPTION OF THE INVENTION

Figure 1:
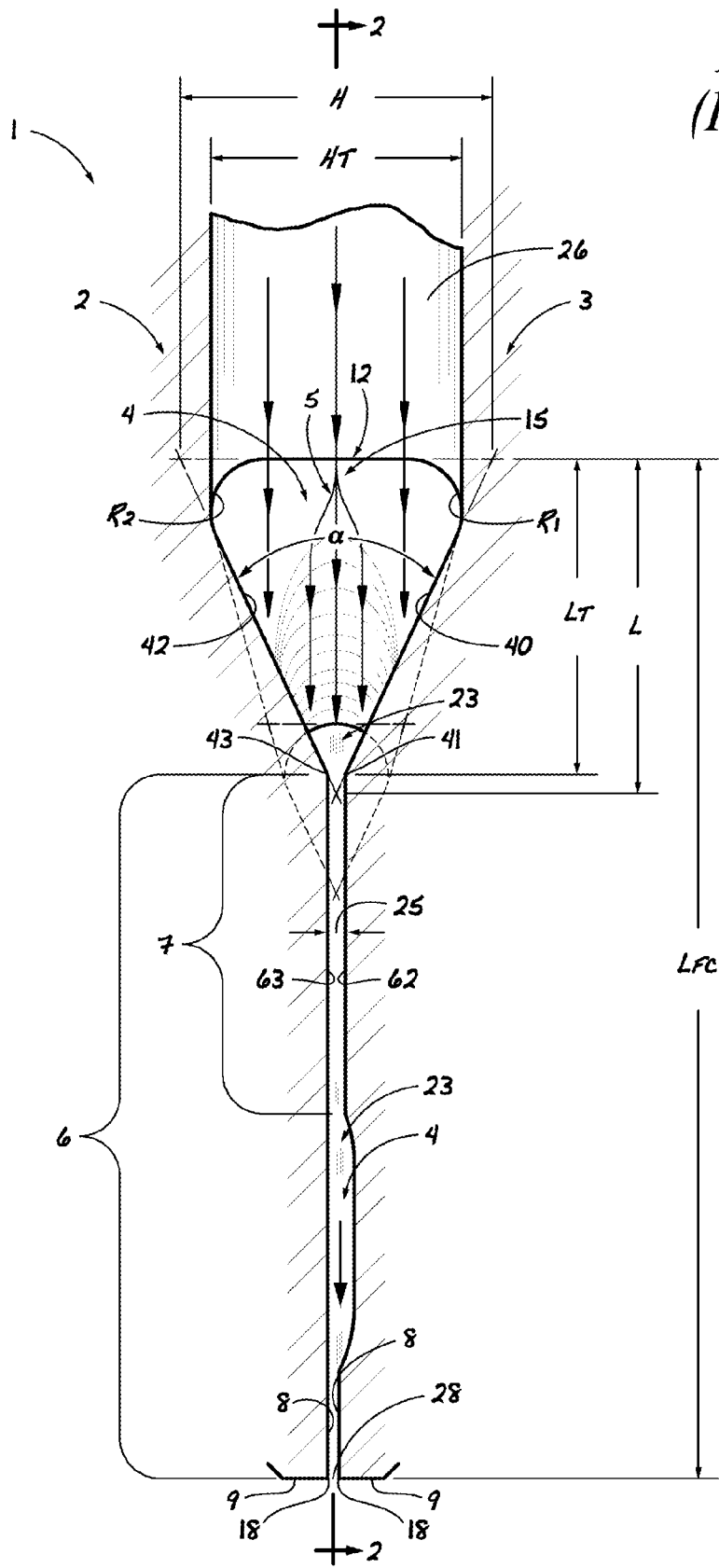
FIG. 1 is a cross-sectional view taken substantially along the centerline of the width of a prior art extrusion die, that illustrates the flow channel cross-sectional boundaries when viewed from the flow channel centerline, and that diagrammatically illustrates flow stream lines and a region of flow transition stagnation.
Figure 2:
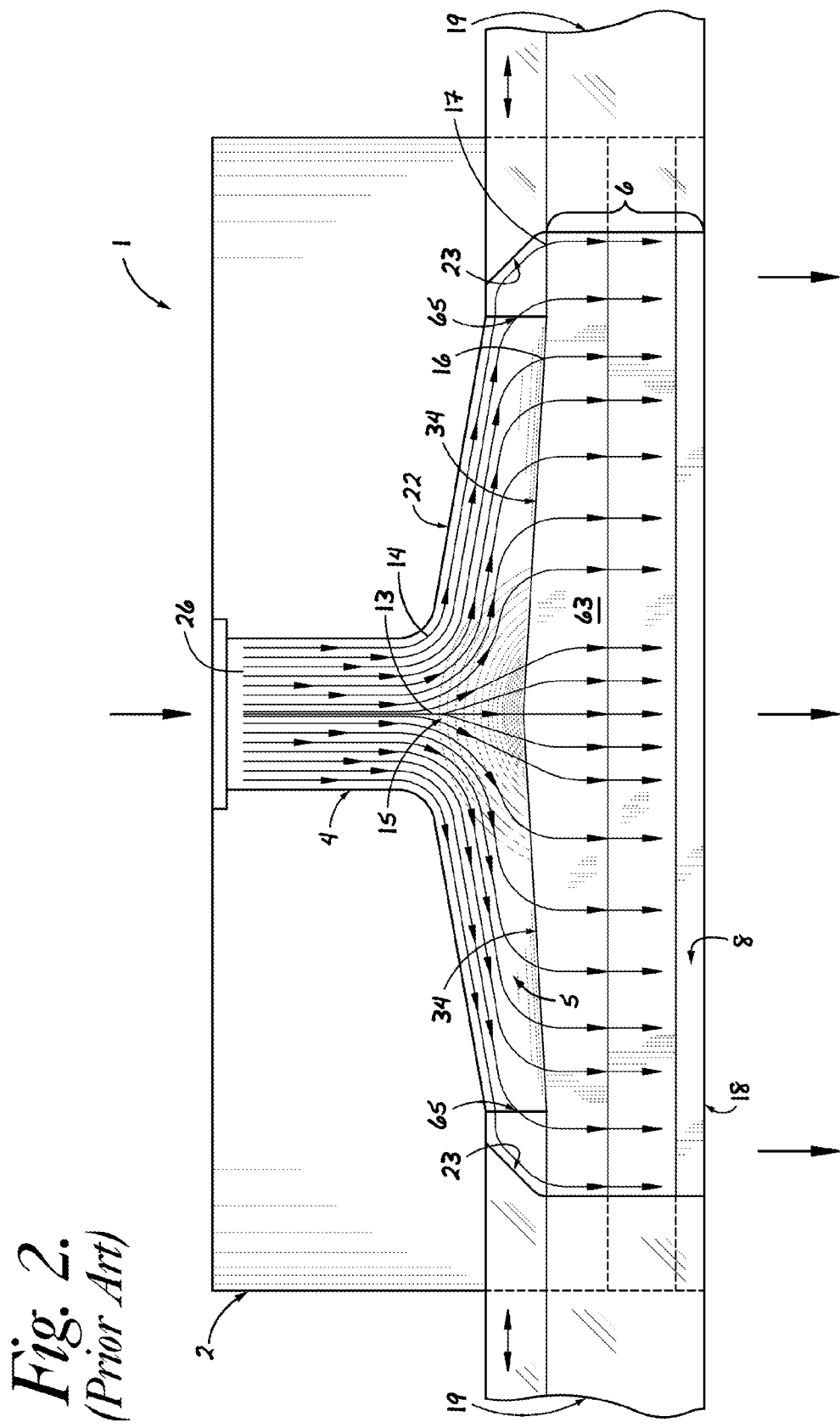
FIG. 2 is a plan view taken substantially along line 2-2 of FIG. 1, that diagrammatically illustrates internal deckles, flow streamlines between a region of transverse flow initiation and the respective loci substantially ending transverse flow of respective streamlines, and the region of transition stagnation.

FIGS. 1-2 are provided for general illustrative purposes, and for brevity, like features are correspondingly labeled throughout and may be discussed only once.

In the description of the invention, relative terms such as "upstream", "downstream" and the like, have been used particularly with reference to the drawing and the main flow direction, to assist understanding.

Figure 3:
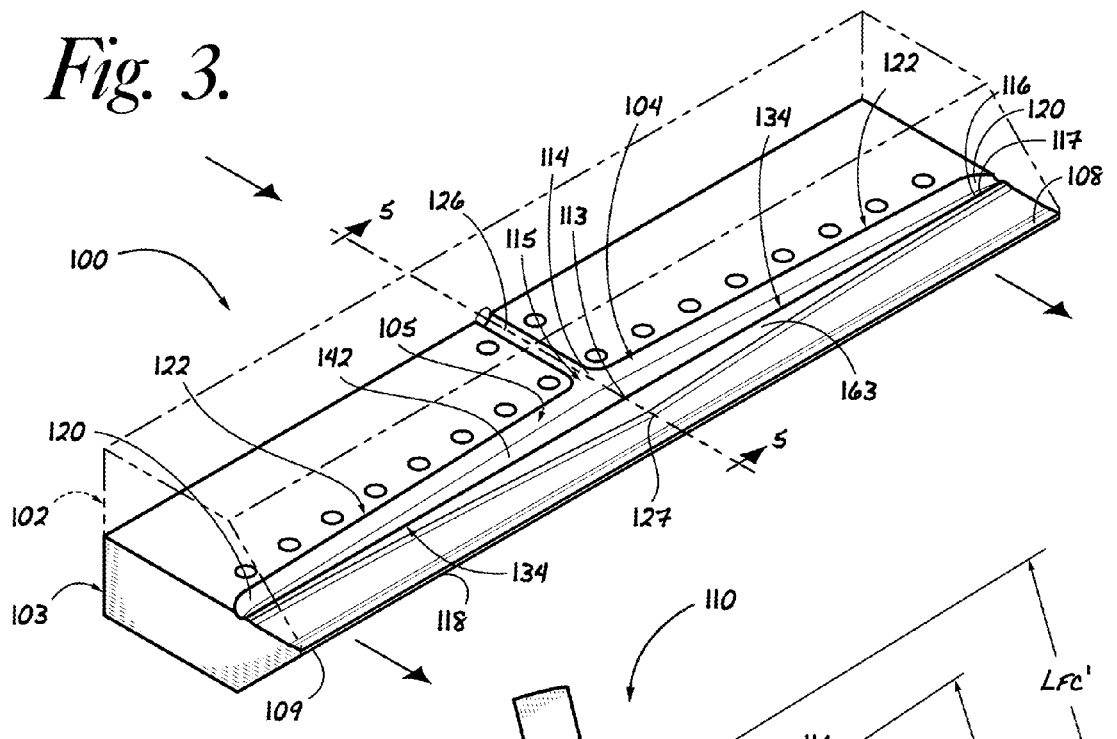
FIGS. 3, 6, 9, 12, 15 and 18 are perspective views of six embodiments of extrusion dies in accordance with the present invention.
Figure 4:
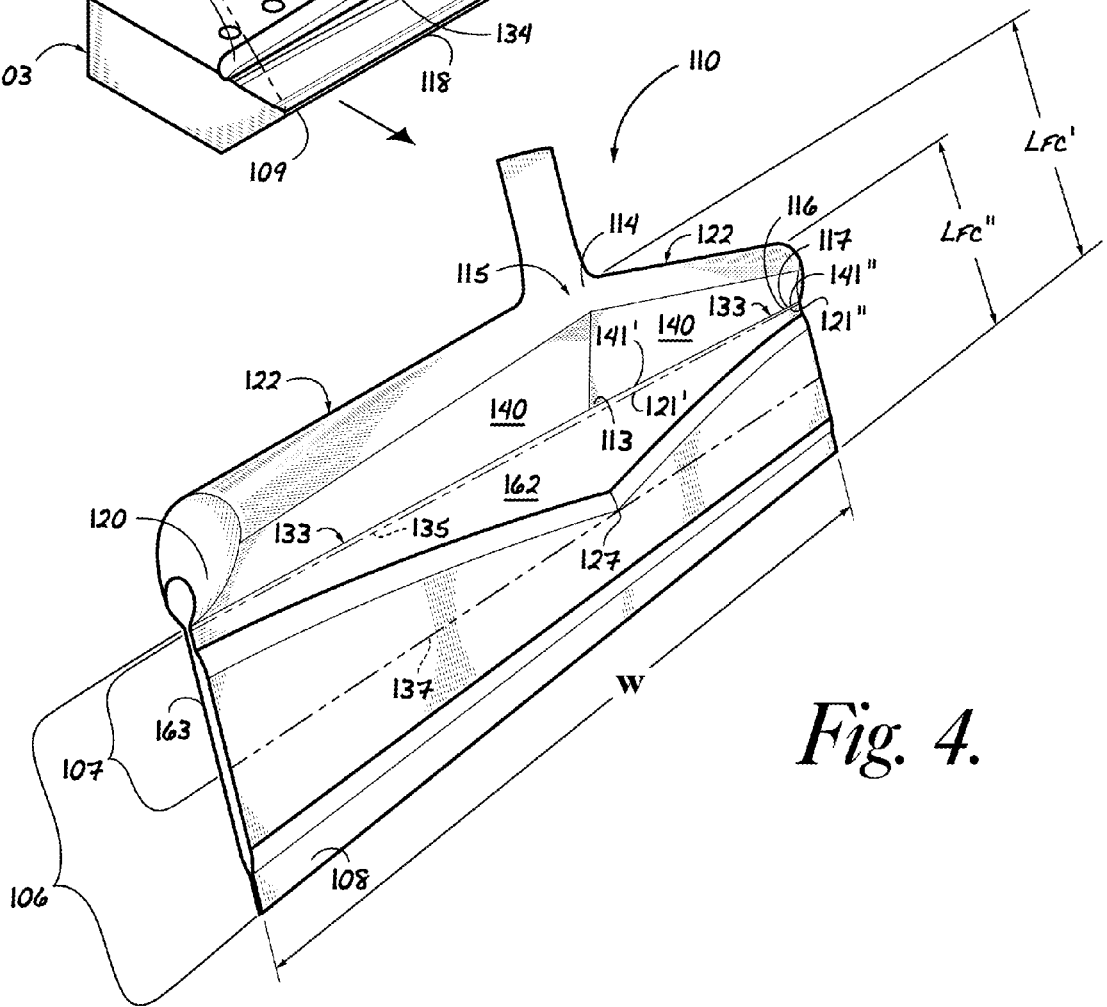
FIGS. 4, 7, 10, 13, 16 and 19 are perspective views of molds taken from the respective flow channels of the extrusion dies of FIGS. 3, 6, 12, 15 and 18, with the deckles removed from the flow channel with respect to the mold of FIG. 19.
Figure 5:
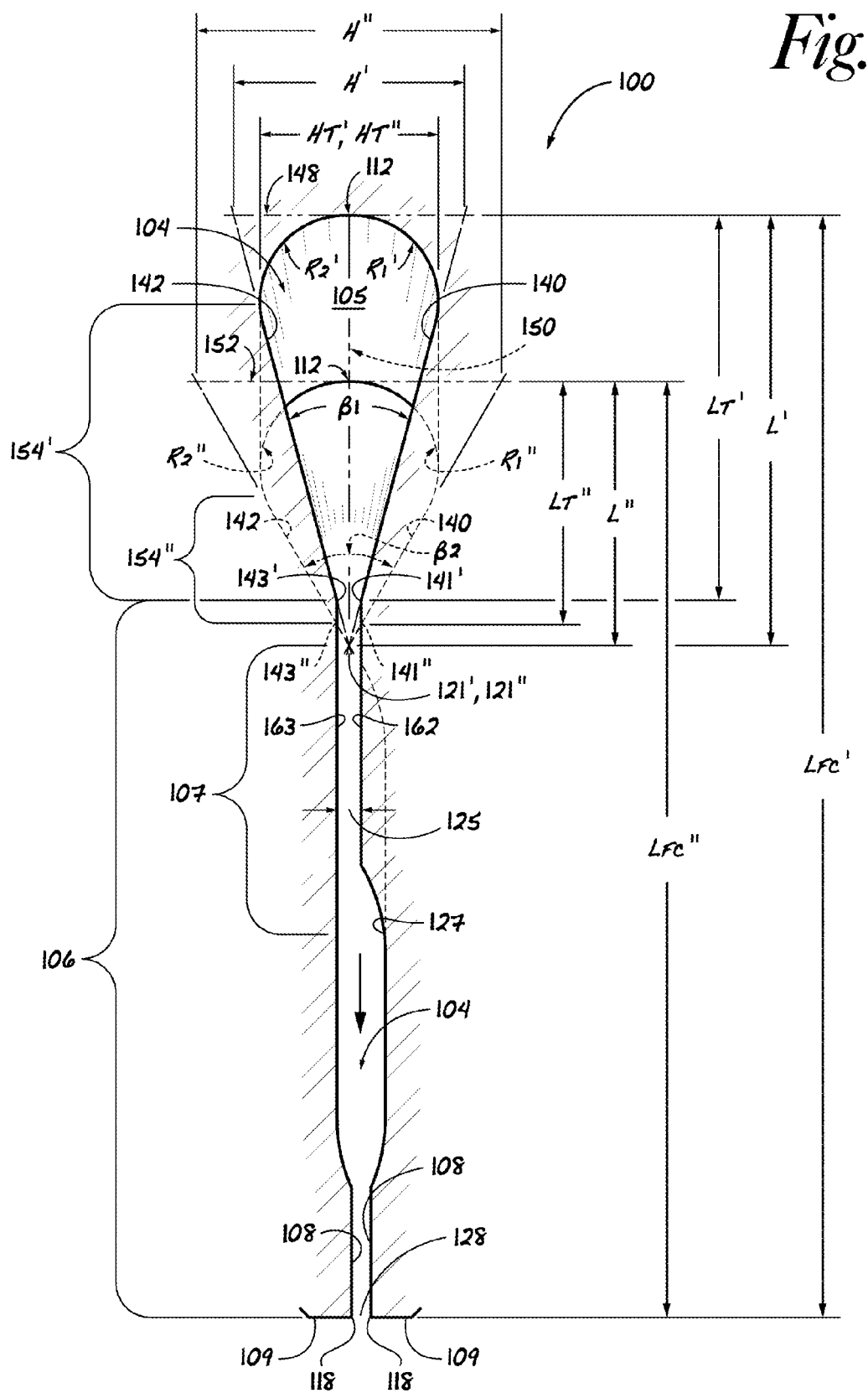
FIG. 5 is a cross-sectional view taken substantially along the centerline of the width of the extrusion die of FIG. 3, that illustrates the flow channel cross-sectional boundaries (the flow channel inlet omitted for clarity) when viewed from line 5-5.

With reference to FIGS. 3 to 5, and to a first embodiment of the invention, a description of an extrusion die 100 including a flow channel 104, is provided with reference to the description of die 1 as indicated by the use of corresponding numbers and alphabetical letters to designate like parts or features. For sake of brevity, therefore, details of die 100 that may be understood from the description of die 1, are generally not repeated. Unlike flow channel 4 of die 1, flow channel 104 of die 100 lacks a gull-wing portion convenient for receiving an internal deckle; however, die 100 may be modified in like manner, as may be understood from the description of the 6$^{th}$ embodiment of this invention.

Arrows located at the entrance to and exit from die 100, indicate the main direction of mass flow through the die beginning at an inlet 126 and ending at an exit orifice 128 of flow channel 104. Flow channel 104 further comprises a generally teardrop-shaped manifold 105, and a downstream flow channel portion 106. Manifold 105 extends transversely from the midline of the manifold width, and provides for widthwise flow across the manifold width generally transverse to the main flow direction. As indicated by FIG. 4, the manifold width may substantially correspond to width W of flow channel 104.

Flow channel inlet 126 terminates at transverse flow-providing manifold 105, which transitions to downstream flow channel portion 106 as appropriate to convey mass flow from an entrance to, and across width W of, and to exit orifice 128 of, flow channel 104. Downstream flow channel portion 106 provides fluid communication between manifold 105 and exit orifice 128, and conveniently includes a preland channel comprising a multi-stage transverse flow restriction zone 107 that prescribes the transverse mass flow distribution across flow channel width W, and includes opposing exit channel surfaces 108.

Flow prescription zone 107 comprises a flow restriction gap 125 formed by opposing preland surfaces 162,163 of downstream flow channel 106. As illustrated in FIG. 5, the surfaces forming gap 125 are generally parallel to each other across the flow channel width, but depending upon design objectives, the gap between the preland surfaces may dimensionally change across the flow channel width (commonly termed "a crowned preland"). Multi-stage flow prescription zone 107 beneficially comprises a primary stage, and a secondary stage having a relatively larger gap than the primary stage. A locus 127 defines the downstream extent of transverse flow prescription zone 107.

Exit edges 118 are formed by the intersection of exit channel surfaces 108 with die faces 109. As illustrated, die faces 109 may be in the same plane. However, as desired or appropriate to accommodate functional objectives, one die face may extend beyond the other die face.

Referring in particular to FIG. 3, die bodies 102, 103 are bound together as a unitary structure by body assembly fasteners (omitted for clarity). The body assembly fasteners form a fastener array (indicated by the fastener apertures) that generally follows, and is adjacent to, an upstream manifold boundary curve 122.

With particular reference to FIGS. 3 and 4, loci 113, 114 selected within a region 115 (generally indicated) of transverse flow initiation and along respective flow stream lines, a locus 116 substantially ending transverse flow of a different stream line flowing from region 115, and a locus 117 substantially ending transverse flow of the stream line related to locus 114, are generally indicated. As illustrated, locus 116 is selected closer to locus 117 than to locus 113, and locus 117 is selected at an end region 120 of manifold 105.

With reference to FIG. 5, opposing manifold surfaces 140, 142 have an angular relationship to each other, and form a transition zone 154'. Corresponding to an angle 131 of a varying angle β, a terminus 141' and a terminus 143' are formed by the intersection of manifold surfaces 140,142 with preland surfaces 162, 163, respectively, of downstream flow channel portion 106. A vertex 121' is formed by the projected intersection of rectilinear manifold surfaces 140,142 of angle β1. Transition zone 154' comprises angle β1. Angle β is an included angle of the manifold transition zone, and varies generally transversely to the main flow direction.

Corresponding to locus 117, manifold surfaces 140,142 form a transition zone 154". A terminus 141" and a terminus 143" are formed by the intersection of manifold surfaces 140,142 with preland surfaces 162,163, respectively, at locus 117. A vertex 121" is formed by the projected intersection of manifold surfaces 140,142 of an angle $β_2$ of varying angle β. Angle $β_2$ is relatively larger than angle β1.

As illustrated in FIG. 5, transition zone 154" is beneficially smaller than transition zone 154', related to change of varying angle β consistent with a decrease of the manifold cross-sectional area. As also illustrated in FIG. 5, vertex 121' is coincident to vertex 121", however as selected or determined, may be in a different location than vertex 121'.

With continued reference to FIG. 5, a datum line 148 (shown in phantom) is tangent to a manifold back wall 112, and is generally perpendicular to a bisector 150 (also shown in phantom) of varying angle β. As illustrated, bisector 150 is the bisector of angle $β_1$ and angle $β_2$. However, as appropriate or desired, the bisector of angle $β_1$ and the bisector of angle $β_2$ may be different from each other. Back wall 112 is the most upstream boundary of transverse flow-providing manifold 105, along the manifold width.

Manifold 105 includes fillet radii R. As illustrated, fillet radii $R_1'$, $R_2'$ are dimensionally equal to each other, and are coterminous with each other so as to join to form a radial back wall at upstream boundary curve 122. However, fillet radius $R_2'$ may be dimensionally different from fillet radius $R_1'$, and coterminous with fillet radius $R_1'$, or as generally illustrated in FIG. 1, appropriately spaced apart from fillet radius $R_1'$. At locus 117, fillet radii $R_1''$, $R_2''$ are dimensionally equal to, and coterminous with, each other. Fillet radii $R_1''$, $R_2''$ are dimensionally equal to fillet radii $R_1'$, $R_2'$. The appropriate fillet radii may be selected or determined to accommodate specific geometric objectives of flow channel 104.

With continued reference to FIG. 5, manifold height H' is a distance between the projected intersections of manifold surfaces 140,142 with datum line 148, and typically may be measured perpendicular to bisector 150. Tangent height $H_T'$ is the maximum distance between tangents of fillet radius $R_1'$ and fillet radius $R_2'$, and typically may be measured parallel to height H'. Length L' is a distance from datum line 148 to vertex 121', and may be measured parallel to bisector 150. Tangent length $L_T'$ is a distance from datum line 148 to terminus 141', and to terminus 143', and may be measured parallel to length L'. When, for example, the manifold transition zone has an overbite as generally illustrated in FIG. 3 of U.S. Pat. No. 5,120,484 to Cloeren, terminus 141' is closer than terminus 143' to vertex 121', and the tangent length may be measured from datum line 148 to terminus 141'. Flow channel length $L_{FC}'$ is a distance from datum line 148 to exit orifice 128, and may be measured perpendicular to an exit edge 118.

Corresponding to locus 117, a reference line 152 (shown in phantom) is tangent to manifold back wall 112, and is generally perpendicular to bisector 150 of angle $β_2$. Manifold height H" is a distance between the projected intersections of manifold surfaces 140,142 with reference line 152, measured as previously described. Tangent height $H_T''$ is the maximum distance between tangents of fillet radius $R_1''$ and fillet radius $R_2''$, and typically may be measured parallel to height H". Length L" is a distance from reference line 152 to vertex 121", measured as previously described. Tangent length $L_T''$ is a distance from reference line 152 to terminus 141", and to terminus 143", and may be measured parallel to length L". When, for example, the manifold transition zone has an overbite, terminus 141" is closer than terminus 143" to vertex 121", and the tangent length may be measured from datum line 148 to terminus 141". Flow channel length $L_{FC}''$ is a distance from reference line 152 to exit orifice 128, measured as previously described.

Referring in particular to mold 110 of FIG. 4, for ease of understanding, identical reference numerals indicate features of mold no associated with corresponding features of FIGS. 3 and 5. Furthermore, with die flow channel 104 being symmetrical (symmetry being typical) about the centerline of width W, like symmetrical features have been indicated with identical reference numerals. As illustrated, transition surfaces 140,142 are non-planar generally transverse to the manifold width, however may be planar. The included angle may increment or decrement linearly or non-linearly transversely from the region of transverse flow initiation, including from the midline of the manifold width. As illustrated, the midline of the manifold width corresponds to the centerline of width W. With reference to die 100, the included angle changes linearly.

Referring to FIGS. 3 to 5, downstream flow channel portion 106 has an upstream boundary curve 133 (best seen in FIG. 4) formed by the intersection of manifold surface 14o with downstream channel surface 162 along width W of flow channel 104, and has an opposing upstream boundary curve 134 (best seen in FIG. 3). Boundary curve 133 includes termini 141', 141". Boundary 133, and opposing boundary 134, which is formed by the intersection of manifold surface 142 with downstream channel surface 163 along width W of flow channel 104, form a boundary common to manifold 105 and flow channel portion 106. Boundary curve 134 includes termini 143', 143".

A boundary curve 135 (shown in phantom in FIG. 4) is defined, transversely from the centerline of width W, by vertices of varying angle β, including vertices 121', 121", along width W of flow channel 104. When, for example, the manifold transition zone has an overbite, boundary 133 is closer than boundary 134 to boundary 135, and the upstream boundary of flow channel portion 106 may be boundary 133. Transverse flow prescription zone 107 has an upstream boundary conveniently coincident to boundary 135, and has a downstream boundary 137 (shown in phantom in FIG. 4) generally parallel to boundary 135 and tangent to locus 127 of flow channel 104.

Opposing curvilinear boundaries 133,134 and boundary curve 135 are oblique to one another. Boundary 135 is a rectilinear curve, and is generally parallel to an exit edge 118. Tables 1,1a provide, by way of example, a matrix of geometric parameters that may be used to define the cross-sectional shape of a generally teardrop-shaped manifold widthwise between the midline and an end of the manifold width, including a back wall boundary curve related to the relationship between the fillet radii R, and including boundary curves 122, 133, 134 and 135, as well as the oblique or parallel relationship of boundaries, including of opposing boundaries, to one another and to an exit edge 118. The changes in manifold cross-sectional geometry may be selected or derived transversely along the width of manifold 105, between the region of transverse flow initiation, including between the midline of the manifold width, and a locus substantially ending transverse mass flow in the manifold, including a locus terminating transverse mass flow in the manifold, and the changes may be linear or non-linear along the manifold width.

Curvilinear boundaries 133,134 may be rectilinear, and rectilinear boundary curve 135 may be curvilinear, transverse from the centerline of flow channel W; and a curvilinear boundary curve 135 may be generally parallel or oblique to curvilinear boundary curves 133,134, or rectilinear boundary curve 135 may be generally parallel or oblique to boundary curves 133,134, and to exit edge 118, depending on the geometric parameters selected or derived to establish the manifold boundaries.

With continuing reference to FIGS. 3 to 5, transverse flow-providing manifold 105 comprises, between the midline and locus 117, a constant tangent height $H_T$, an increasing height H as indicated by comparison of H' to H", a decreasing tangent length $L_T$ as indicated by comparison of $L_T'$ to $L_T''$, and a decreasing manifold cross-sectional area including a varying transition zone comprising a changing included angle β. As described, a decreasing manifold cross-section may have a constant tangent height $H_T$ and a changing height H, and the varying included angle may change related to the changing height H. Geometric parameters that may affect the varying included angle, may in addition to a changing height H, include a changing length L, a changing tangent length $L_T$, a changing fillet radii R, and combinations thereof. Geometric parameter variations associated with the varying included angle and a constant, or substantially constant, tangent height $H_T$, include a changing height H, a changing length L, a changing tangent length $L_T$, a changing fillet radii R, and combinations thereof.

Geometric parameter variations associated with a decreasing manifold cross-section, may include a constant tangent height $H_T$ and a changing tangent length $L_T$, and the varying included angle may change related to the changing tangent length $L_T$; and a constant tangent height $H_T$ and a changing length L, and the varying included angle may change related to the changing length L; a constant tangent height $H_T$ and a changing height H, and the varying included angle may change related to the changing height H; a constant tangent height $H_T$ and a changing fillet radius R, and the included angle may change related to the changing fillet radius R; and combinations thereof; and a constant tangent height $H_T$, and the included angle change may be related to and consistent with decreasing manifold cross-sectional area.

The changing transition zone may include a relatively smaller angle β related to a relatively longer tangent length $L_T$, and a relatively larger angle β related to a relatively shorter tangent length $L_T$. The varying transition zone advantageously has a smaller angle $β_1$, than angle $β_2$, that is related to a relatively longer tangent length $L_T$ to beneficially reduce transition stagnation at, and proximate to, the region of transverse flow initiation, and has a suitably larger angle $β_2$ that is consistent with a decreased manifold cross-sectional area so as to advantageously increase the mass flow exchange rate across the manifold width, and particularly within a manifold end region.

These benefits are independent of the specific locations of selected loci, including loci 113, 114, 116, 117. As will become understood from the description of other embodiments of this invention, these loci have been selected to assist, by way of example, understanding of the invention. Beneficially, a varying transition zone comprises an included angle β that changes consistent with decrease in the manifold cross-sectional area, from the region of transverse flow initiation, including from the midline of the manifold width, to an end of the manifold terminating transverse mass flow within the manifold.

As described, a generally teardrop-shaped manifold cross-section in accordance with the invention, includes height H, tangent height $H_T$, fillet radius R, length L, tangent length $L_T$, and an included angle β that beneficially may vary transversely from the manifold midline. Useful geometric parameters for defining the manifold cross-sectional shapes include H, $H_T$, L, R, $L_T$ and angle β. As illustrated in Tables 1,1a, a combination of parameters may be selected (indicated as "S") to derive (indicated as "D") other parameters to define the manifold cross-sectional geometry across its transverse width. Thus, there are multiple ways by which the manifold cross-sectional shapes may be defined without deviating from the invention.

The transition zone included angle may be selected (S) or derived (D) across the manifold width. By way of example, Tables 1,1a provide illustrations of selected (S) or derived (D) parameters from which the increment or decrement of the varying angle β and change of other geometric parameters, are selected (S) or may be derived (D) in a typical generally teardrop-shaped manifold. For purposes of Tables 1,1a, "β" relates a varying included angle corresponding to a varying transition zone in accordance with the present invention, and "α" relates to a transition zone comprising a non-varying, constant included angle.

TABLE 1

(Generally Teardrop-Shaped Manifold)

| H | D | D | D | D | D | D | D | D | D | D |
|---|---|---|---|---|---|---|---|---|---|---|
| $H_T$ | D | D | D | D | S | S | S | S | S | S |
| L | D | S | S | S | D | D | D | S | S | S |
| $L_T$ | S | D | S | S | D | S | S | D | D | S |
| R | S | S | D | S | S | D | S | D | S | D |
| β, α | S | S | S | D | S | S | D | S | D | D |

TABLE 1a

| H | S | S | S | S | S | S | S | S | S | S |
|---|---|---|---|---|---|---|---|---|---|---|
| $H_T$ | D | D | D | D | D | D | S | S | S | S |
| L | D | D | D | S | S | S | D | D | D | S |
| $L_T$ | D | S | S | D | D | S | D | S | S | D |
| R | S | D | S | D | S | D | D | S | D | D |
| β, α | S | S | D | S | D | D | S | D | D | D |

Figure 6:
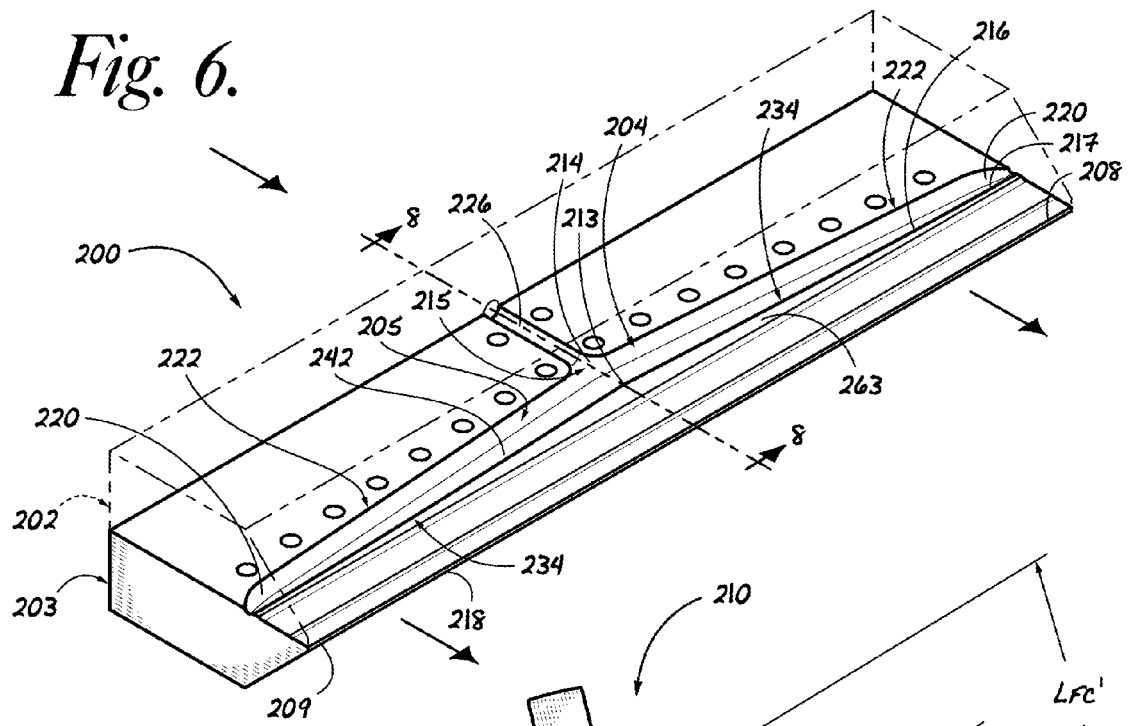
Figure 7:
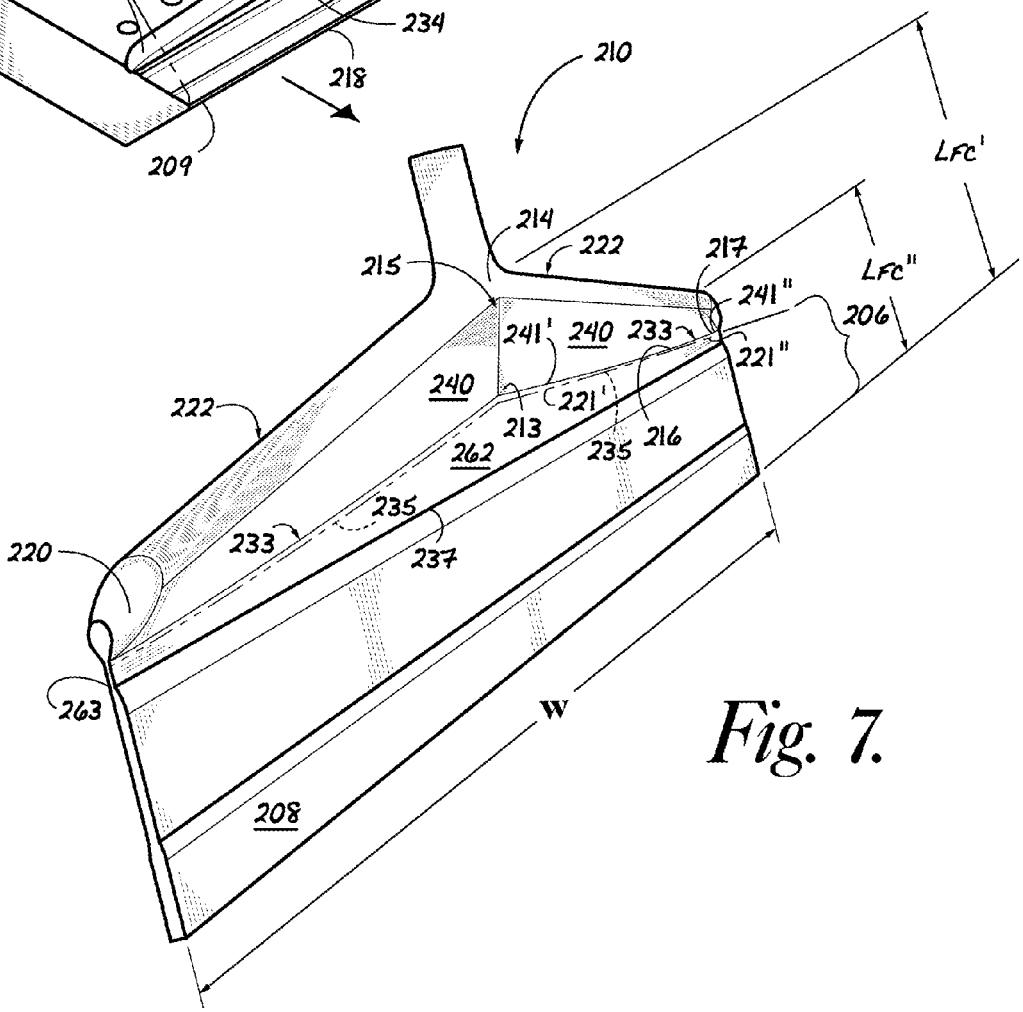
Figure 8:
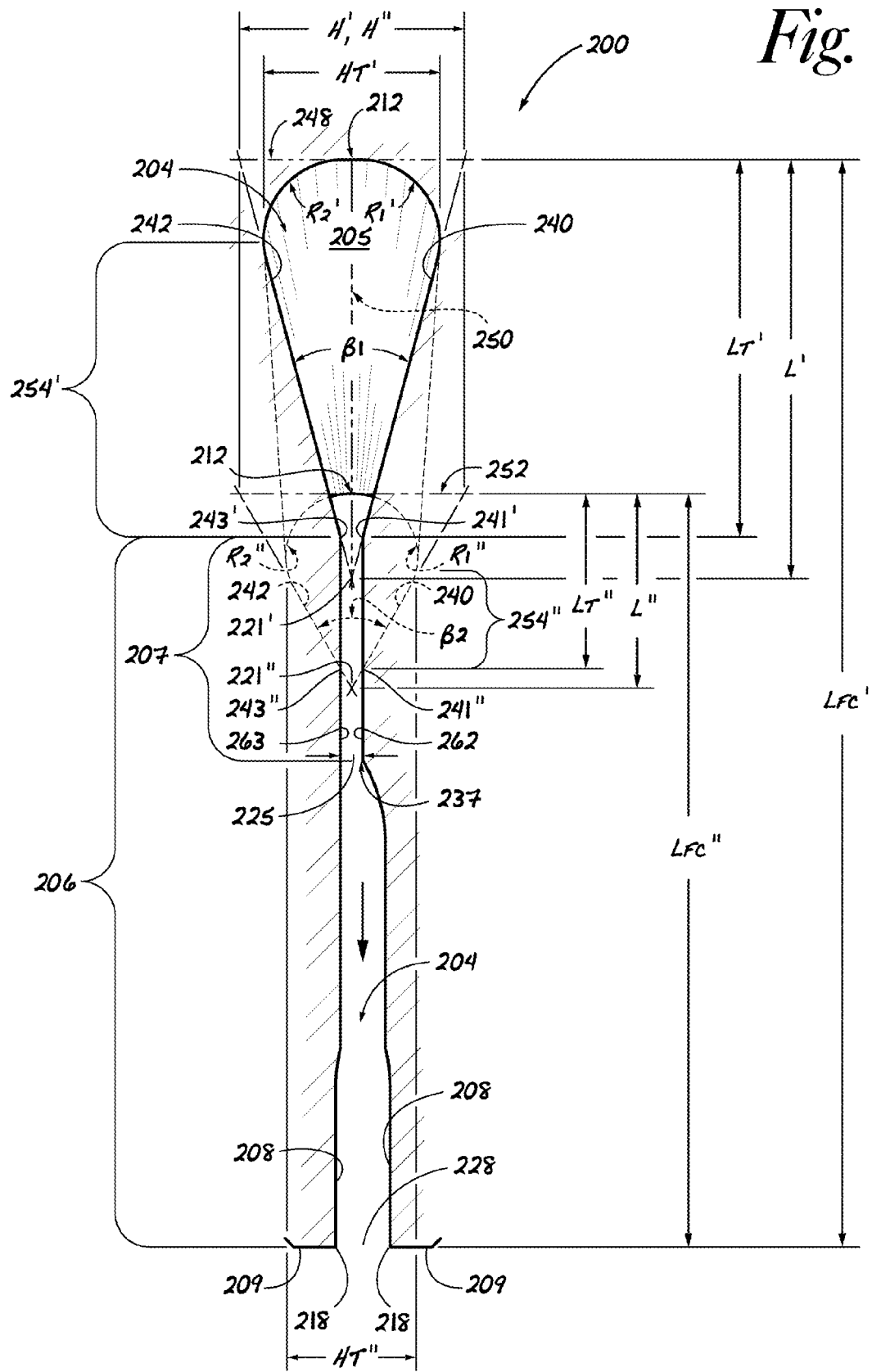
FIG. 8 is a cross-sectional view taken substantially along the centerline of the width of the extrusion die of FIG. 6, that illustrates the flow channel cross-sectional boundaries (the flow channel inlet omitted for clarity) when viewed from line 8-8.

With reference to FIGS. 6 to 8, and to a second embodiment of the invention, an abbreviated description of an extrusion die 200 including a flow channel 204, is provided with reference to the description of die 100 as indicated by the use of corresponding numbers and alphabetical letters to designate like parts or features. For sake of brevity, therefore, details of die 200 that may be understood from the description of die 100, are generally not repeated. Like flow channel 104 of die 100, flow channel 204 of die 200, as illustrated, lacks a gull-wing portion convenient for receiving an internal deckle; however, die 200 may be modified as may be understood from the description of the 6$^{th}$ embodiment of this invention.

Flow channel 204 includes a manifold 205, which extends transversely from the midline of the manifold width, and as indicated in FIG. 7, the manifold width may substantially correspond to width W of flow channel 204. Downstream flow channel portion 206 of flow channel 204 conveniently includes a preland channel comprising a generally coathanger-shaped, transverse flow restriction zone 207 that prescribes the transverse mass flow distribution across flow channel width W, and includes opposing exit channel surfaces 208. A generally rectilinear boundary 237 defines the downstream extent of transverse flow prescription zone 207.

With continued reference to FIGS. 6 and 7, loci 213, 214 selected within a region 215 (generally indicated) of transverse flow initiation and along respective flow stream lines, a locus 216 substantially ending transverse flow of a different stream line flowing from region 215, and a locus 217 substantially ending transverse flow of the stream line related to locus 214, are generally indicated. Locus 216 is selected between locus 213 and locus 217, and as illustrated, is selected further from locus 217 than locus 116 is from locus 117.

With particular reference to FIG. 8, a vertex 221' is formed by the projected intersection of rectilinear manifold surfaces 240,242 of an angle $β_1$. A transition zone 254' is also formed by manifold surfaces 240,242 of angle $β_1$. Varying angle β is an included angle that varies generally transversely to the main flow direction. Also corresponding to angle $β_1$, a terminus 241' and a terminus 243' are formed by the intersection of manifold surfaces 240,242 with preland surfaces 262,263, respectively, of downstream flow channel 206.

Corresponding to locus 217, vertex 221" is formed by the projected intersection of manifold surfaces 240,242 of an angle $β_2$ of varying angle θ. Manifold surfaces 240,242 form a transition zone 254" that is beneficially smaller than transition zone 254', related to change of varying angle β consistent with a decrease of the manifold cross-sectional area. Angle β$_2$ is relatively larger than angle β$_1$.

As illustrated in FIG. 8, vertex 221" is spaced apart from, and is located downstream of, vertex 221'. However, as selected or determined, vertex 221' may be coincident to vertex 221", or the location of the vertices may otherwise be different. As further illustrated in FIG. 8, termini 241',243' are upstream of termini 241",243". However, termini 241',243' may be downstream of, or coincident to, termini 241",243".

With continued reference to FIG. 8, a datum line 248 (shown in phantom) is tangent to a manifold back wall 212, and is generally perpendicular to a bisector 250 (also shown in phantom) of varying angle β. Corresponding to locus 217, a reference line 252 (also shown in phantom) is tangent to back wall 212, and is generally perpendicular to bisector 250 of angle β$_2$. As illustrated, bisector 250 is the bisector of angle β$_1$ and angle β$_2$. However, as appropriate or desired, the bisector of angle β$_1$ and the bisector of angle β$_2$ may be oblique to each other, in which case vertices 221',221" may be in different relative locations than illustrated. Back wall 212 is the most upstream boundary of transverse flow-providing manifold 205, along the manifold width.

Manifold 205 includes fillet radii R. Except as described, reference should be made to the corresponding description related to fillet radii R of die 100. As illustrated in FIG. 8, fillet radii R$_1$", R$_2$" are smaller than fillet radii R$_1$', R$_2$', respectively. Fillet radii R$_1$', R$_2$' may dimensionally correspond to the smaller fillet radii at locus 217; in such case, fillet radii R$_1$', R$_2$' may be appropriately spaced apart from each other as generally illustrated in FIG. 1.

With continued reference to FIG. 8, reference should be made to the corresponding description related to manifold height H, tangent height H$_T$, length L, tangent length L$_T$ and flow channel length L$_{FC}$ of die 100, with respect to manifold height H, tangent height H$_T$, length L, tangent length L$_T$ and flow channel length L$_{FC}$ of die 200. Unlike die 100, tangent height H$_T$' is greater than tangent height H$_T$", and height H' corresponds to height H". Length L', tangent length L$_T$' and flow channel length L$_{FC}$' are longer than length L", tangent length L$_T$", and flow channel length L$_{FC}$".

Referring in particular to mold 210 of FIG. 7, for ease of understanding, identical reference numerals indicate features of mold 210 associated with corresponding features of FIGS. 6 and 8. Furthermore, with die flow channel 204 being symmetrical about the centerline of width W, like symmetrical features have been indicated with identical reference numerals. As illustrated, transition surfaces 240,242 are non-planar generally transverse to the manifold width, however may be planar. The included angle may increment or decrement linearly or non-linearly transversely from the region of transverse flow initiation, including from the midline of the manifold width. With reference to die 200, the included angle changes linearly.

Referring to FIGS. 6 to 8, a boundary curve 233 (best seen in FIG. 7) and an opposing boundary curve 234 (best seen in FIG. 6) form a boundary common to manifold 205 and flow channel portion 206. Boundary curve 233 includes termini 241',241", and boundary curve 234 includes termini 243', 243". Generally coathanger-shaped, transverse flow prescription zone 207 has an upstream boundary conveniently coincident to boundaries 233 and 234, and downstream boundary 237 of transverse flow prescription zone 207 is generally parallel to an exit edge 218.

A boundary curve 235 (shown in phantom in FIG. 7) is defined, transversely from the centerline of width W, by vertices, including vertices 221', 221", of varying angle 13 along width W of flow channel 204. Boundary curve 235 is curvilinear, and, as illustrated, is oblique to boundaries 233,234, and to exit edge 218. As in the case of die 100, Tables 1,1a provide, by way of example, a matrix of geometric parameters that may be used to define the cross-sectional shape of a generally teardrop-shaped manifold widthwise between the midline and an end of the manifold width, including a back wall boundary curve related to the relationship between the fillet radii R, and including boundary curves 222, 233, 234 and 235, as well as the oblique or parallel relationship of boundaries, including of opposing boundaries, to one another. The changes in manifold cross-sectional geometry may be selected or derived transversely along the width of the manifold, between the region of transverse flow initiation, including between the midline of the manifold width, and a locus substantially ending transverse mass flow in the manifold, including a locus terminating transverse mass flow in the manifold, and the changes may be linear or non-linear along the manifold width.

Curvilinear boundaries 233,234 may be rectilinear widthwise from the centerline of the flow channel width, and curvilinear boundary curve 235 may also be rectilinear from the centerline to an end of the flow channel width; and curvilinear boundary curve 235 may be generally parallel or oblique to curvilinear boundary curves 233,234, or a boundary curve 235 (rectilinear widthwise from the centerline) may be generally parallel or oblique to boundary curves 233,234, depending on the geometric parameters selected or derived to establish the manifold boundaries.

With continuing reference to FIGS. 6 to 8, transverse flow-providing manifold 205 has a decreasing cross-sectional area including a varying transition zone comprising a changing included angle β. Different from flow channel 104 of die 100 with respect to tangent height H$_T$ and height H, manifold 205 comprises, between the midline and locus 217, a decreasing tangent height H$_T$ as indicated by comparison of H$_T$' to H$_T$", and a constant height H. Also unlike flow channel 104, flow channel 204 comprises a generally curvilinear coathanger preland shape, however, if desired, may comprise generally rectilinear coathanger boundaries.

Geometric parameters that may affect the varying included angle, may in addition to a changing tangent height H$_T$, include a changing length L, a changing tangent length L$_T$, a changing fillet radii R, and combinations thereof. Geometric parameter variations associated with the varying included angle and a constant, or substantially constant, height H, include a changing tangent height H$_T$, a changing length L, a changing tangent length L$_T$, a changing fillet radii R, and combinations thereof.

As described, a decreasing manifold cross-section may have a constant height H and a changing tangent height H$_T$, and the varying included angle may change related to the changing tangent height H$_T$. For this arrangement, the decreasing manifold cross-section may include a relatively smaller angle β related to a relatively longer length L, and a relatively larger angle β related to a relatively shorter length L.

Geometric parameter variations associated with a decreasing manifold cross-section, may include a constant height H and a changing tangent length L$_T$, and the varying included angle may change related to the changing tangent length L$_T$; a constant height H and a changing length L, and the varying included angle may change related to the changing length L; a constant height H and a changing fillet radius R, and the included angle may change related to the changing fillet radius R; and combinations thereof; and a constant height H, and the included angle change may be related to and consistent with a decreasing manifold cross-sectional area toward a manifold end.

Like flow channel 104, the varying transition zone advantageously has a smaller angle $\beta_1$, than angle $\beta_2$, that is related to a relatively longer tangent length $L_T$ to beneficially reduce transition stagnation at, and proximate to, a region of transverse flow initiation, and has an angle $\beta_2$ that is suitably larger than angle $\beta_1$ consistent with a decreased manifold cross-sectional area so as to advantageously increase the mass flow exchange rate at a locus substantially ending transverse flow within the manifold.

These benefits are independent of the specific locations of selected loci 213, 214, 216, 217. Thus, these loci have been selected to assist, by way of example, understanding of the invention. Beneficially, a varying transition zone comprises an included angle that changes consistent with decrease in the manifold cross-sectional area, from the region of transverse flow initiation, including from the midline of the manifold width, to a locus substantially ending transverse flow within the manifold.

These benefits of a varying included angle in accordance with the present invention, may be obtained regardless whether the transverse flow prescription zone is a multi-stage zone or a generally coathanger-shaped zone or any other transverse flow restriction zone that provides a prescribed transverse flow distribution. Likewise, to obtain the foregoing benefits, it is not essential to maintain a constant tangent height $H_T$ or a constant height H across the manifold width.

Figure 9:
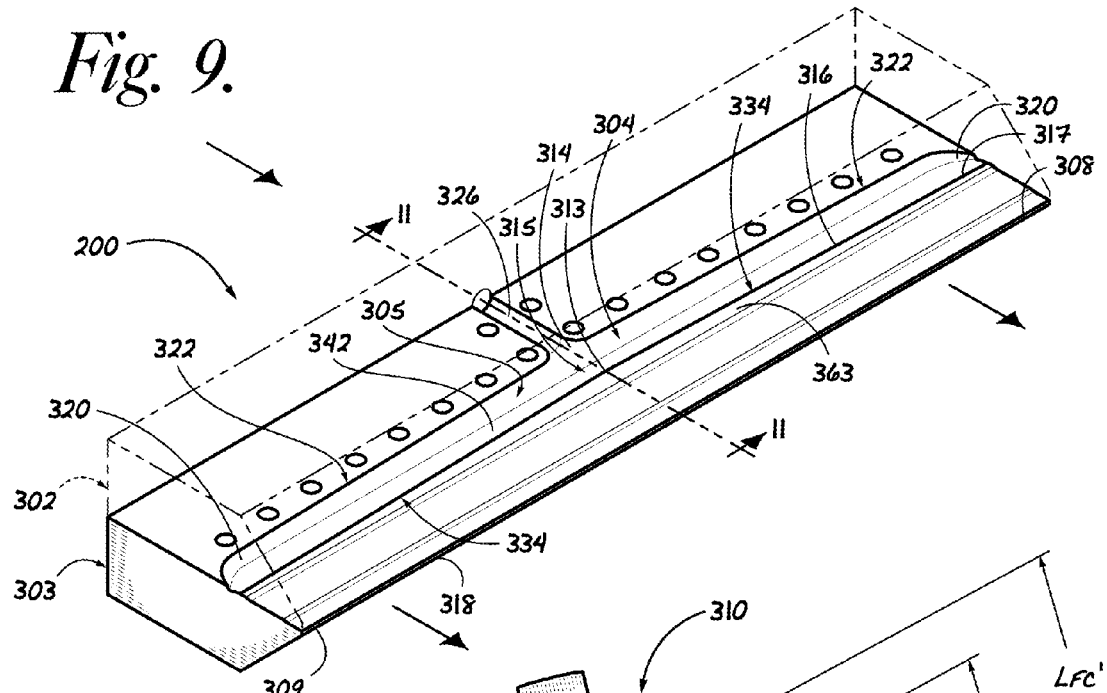
Figure 10:
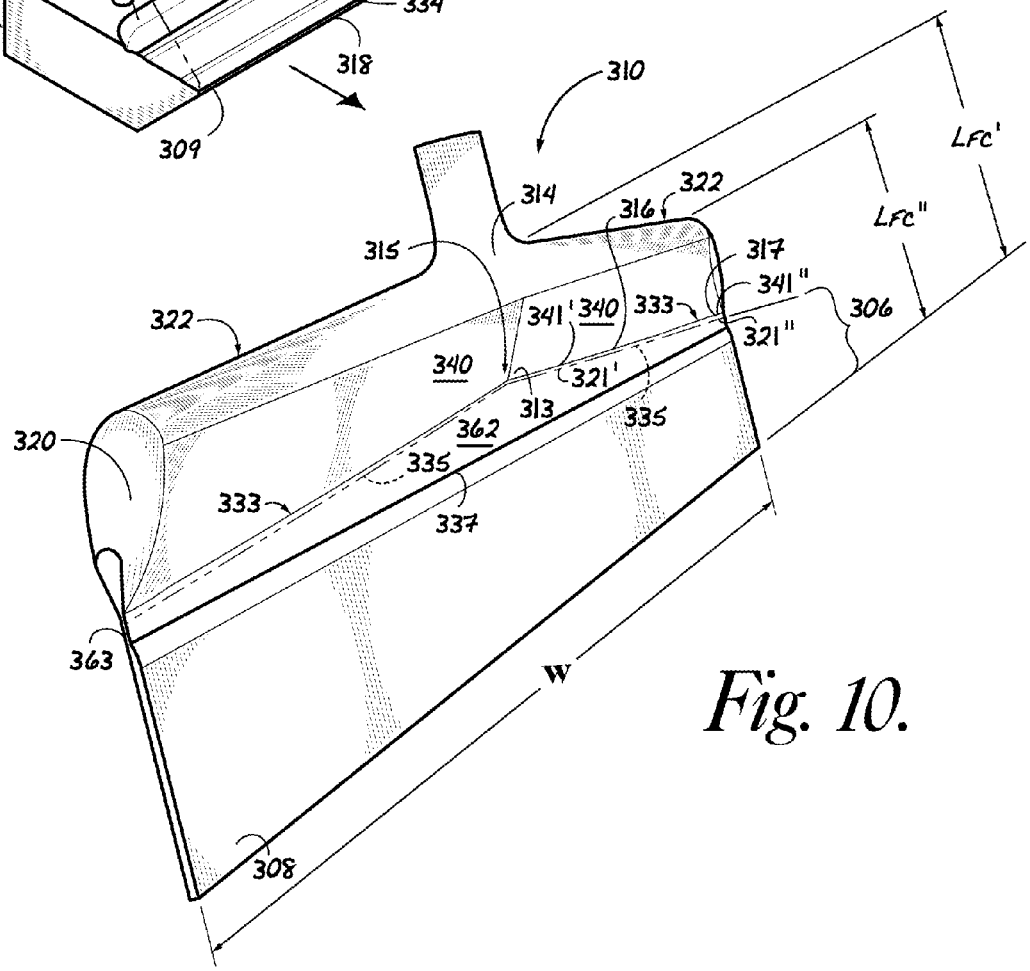
Figure 11:
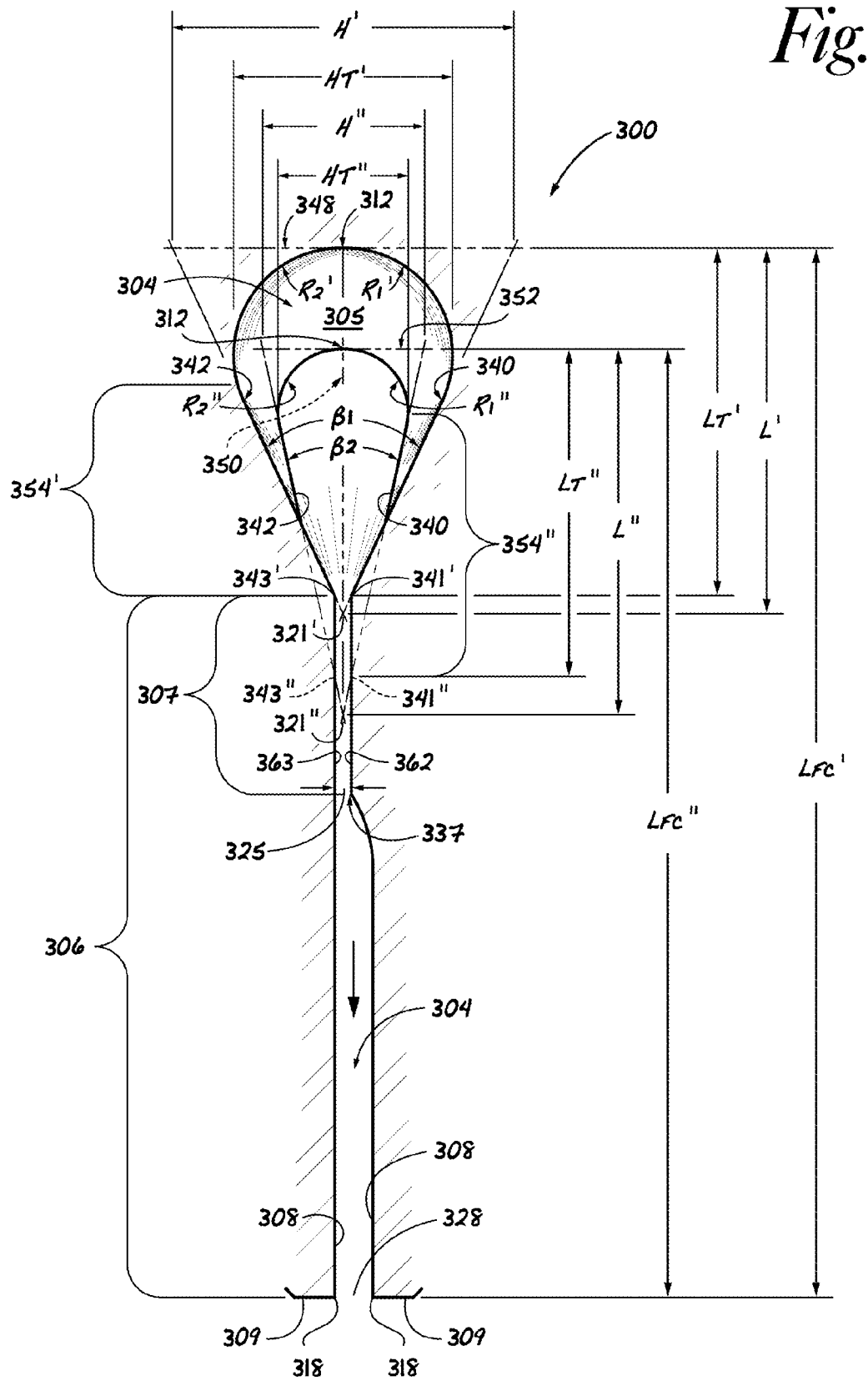
FIG. 11 is a cross-sectional view taken substantially along the centerline of the width of the extrusion die of FIG. 9, that illustrates the flow channel cross-sectional boundaries (the flow channel inlet omitted for clarity) when viewed from line 11-11.

With reference to FIGS. 9-11, and to a third embodiment of the invention, an abbreviated description of an extrusion die 300 including a flow channel 304, is provided with reference to the description of die 100 as indicated by the use of corresponding numbers and alphabetical letters to designate like parts or features. For sake of brevity, therefore, details of die 300 that may be understood from the description of die 100, are generally not repeated. Like flow channel 104 of die 100, flow channel 304 of die 300, as illustrated, lacks a gull-wing portion convenient for receiving an internal deckle; however, die 300 may be modified as may be understood from the description of the $6^{th}$ embodiment of this invention.

Flow channel 304 includes a manifold 305, which extends transversely from the midline of the manifold width, and as illustrated in FIG. 9, the manifold width may substantially correspond to width W of flow channel 304. Downstream flow channel portion 306 of flow channel 304 conveniently includes a preland channel comprising a generally coathanger-shaped, transverse flow restriction zone 307 that prescribes the transverse mass flow distribution across flow channel width W, and includes opposing exit channel surfaces 308. A generally rectilinear boundary 337 defines the downstream extent of transverse flow prescription zone 307.

With continued reference to FIGS. 9 and 10, loci 313, 314 selected within a region 315 (generally indicated) of transverse flow initiation and along respective flow stream lines, a locus 316 substantially ending transverse flow of a different stream line flowing from region 315, and a locus 317 substantially ending transverse flow of the stream line related to locus 314, are generally indicated. Locus 316 is selected between 313 and locus 317, and as illustrated, is selected closer to locus 313 than locus 216 is to locus 213.

With particular reference to FIG. 11, a vertex 321' is formed by the projected intersection of rectilinear manifold surfaces 340,342 of an angle $\beta_1$. A transition zone 354' is also formed by manifold surfaces 340,342 of angle $\beta 1$. Varying angle $\beta$ is an included angle that varies generally transversely to the main flow direction. Also corresponding to angle $\beta_1$, a terminus 341' and a terminus 343' are formed by the intersection of manifold surfaces 340,342 with preland surfaces 362, 363, respectively, of downstream flow channel 306.

Corresponding to locus 317, vertex 321" is formed by the projected intersection of manifold surfaces 340,342 of an angle $\beta_2$ of varying angle $\beta$. Manifold surfaces 340,342 form a transition zone 354" that is beneficially smaller than transition zone 354', related to change of varying angle $\beta$ consistent with a decrease of the manifold cross-sectional area. Angle $\beta_2$ is smaller than angle $\beta_1$.

As illustrated in FIG. 11, vertex 321" is spaced apart from, and is located downstream of, vertex 321'. However, as selected or determined, vertex 321' may be coincident to vertex 321", or the location of the vertices may otherwise be different. As further illustrated in FIG. 11, termini 341',343' are upstream of termini 341",343". However, termini 341', 343' may be downstream of, or coincident to, termini 341", 343".

With continued reference to FIG. 11, a datum line 348 (shown in phantom) is tangent to a manifold back wall 312, and is generally perpendicular to a bisector 350 (also shown in phantom) of varying angle $\beta$. Corresponding to locus 317, a reference line 352 (also shown in phantom) is tangent to back wall 312, and is generally perpendicular to bisector 350 of angle $\beta_2$. Back wall 312 is the most upstream boundary of transverse flow-providing manifold 305, along the manifold width. As illustrated, bisector 350 is the bisector of angle $\beta_1$ and the bisector of angle $\beta_2$. However, as appropriate or desired, the bisector of angle $\beta_1$ and the bisector of angle $\beta_2$ may be oblique to each other.

Manifold 305 includes fillet radii R. Except as described, reference should be made to the corresponding description related to fillet radii R of die 100. As illustrated in FIG. 11, fillet radii $R_1$", $R_2$" are smaller than fillet radii $R_1$', $R_2$', respectively. However, fillet radii $R_1$', $R_2$', may dimensionally correspond to the smaller fillet radii at locus 317; in such case, fillet radii $R_1$',$R_2$' may be appropriately spaced apart from each other.

With particular reference to FIG. 11, reference should be made to the corresponding description related to manifold height H, tangent height $H_T$, length L, tangent length $L_T$ and flow channel length $L_{FC}$ of die 100, with respect to manifold height H, tangent height $H_T$, length L, tangent length $L_T$ and flow channel length $L_{FC}$ of die 300.

Height H' and tangent height $H_T$' are greater than height H" and tangent height $H_T$". Tangent length $L_T$' is greater than, but substantially corresponds to, tangent length $L_T$". Length L' corresponds to length L", and the varying angle $\beta$ changes related to a constant length L and a diminishing cross-sectional area manifold. However, tangent length $L_T$' may correspond to tangent length $L_T$", and length L' may substantially correspond to length L", or length L' and tangent length $L_T$' may correspond to length L" and tangent length $L_T$". Beneficially, this inventive embodiment provides a ratio of $L_{FC}$'/$L_{FC}$" that is relatively closer to 1:1, as compared to die 100, as structurally beneficial to reduce differential clamshell deflection of unitary die assembly 300.

Referring in particular to mold 310 of FIG. 10, for ease of understanding, identical reference numerals indicate features of mold 310 associated with corresponding features of FIGS. 9 and 11. Furthermore, with flow channel 304 being symmetrical about the centerline of width W, like symmetrical features have been indicated with identical reference numerals. As illustrated, transition surfaces 340,342 are non-planar generally transverse to the manifold width, however may be planar. The included angle may increment or decrement linearly or non-linearly from the region of transverse flow initiation, including from the midline of the manifold width. With reference to die 300, the included angle changes linearly.

Referring to FIGS. 9-11, a boundary curve 333 (best seen in FIG. 10) and an opposing boundary curve 334 (best seen in FIG. 9) form a boundary common to manifold 305 and flow channel portion 306. Boundary curve 333 includes termini 341',341", and boundary curve 334 includes termini 343', 343". The generally coathanger-shaped, transverse flow prescription zone 307 of flow channel 306 has an upstream boundary conveniently coincident to boundaries 333 and 334, and has a downstream boundary 337 generally parallel to an exit edge 318 of flow channel 304.

A boundary curve 335 (shown in phantom in FIG. 10) is defined widthwise from the centerline of flow channel 304, by vertices of varying angle β, including vertices 321', 321". Boundary 335 is curvilinear, and as illustrated, is oblique to boundaries 333,334, and to exit edge 318. As in the case of die 100, Tables 1,1a provide, by way of example, a matrix of geometric parameters that may be used to define the cross-sectional shape of a generally teardrop-shaped manifold between the midline and an end of the manifold width, including a back wall boundary curve related to the relationship between the fillet radii R, and including boundary curves 322, 333, 334 and 335, as well as the oblique or parallel relationship of boundaries, including of opposing boundaries, to one another. The changes in manifold cross-sectional geometry may be selected or derived transversely along the width of the manifold, between the region of transverse flow initiation, including between the midline of the manifold width, and a locus substantially ending transverse flow in the manifold, and the changes may be linear or non-linear along the manifold width.

Curvilinear boundaries 333,334 may be rectilinear from the midline to an end of the manifold width, and curvilinear boundary curve 335 may also be rectilinear widthwise from the centerline of the flow channel width; and curvilinear boundary curve 335 may be generally parallel or oblique to curvilinear boundary curves 333,334, or a boundary curve 335 (rectilinear widthwise from the centerline) may be generally parallel or oblique to rectilinear boundary curves 333, 334, depending on the geometric parameters selected or derived to establish the manifold boundaries.

With continuing reference to FIGS. 9 to 11, transverse flow-providing manifold 305 comprises, between the midline and locus 317, a decreasing tangent height $H_T$ (as indicated by comparison of $H_T'$ to $H_T''$), and a changing manifold cross-sectional area along the manifold width, and different from flow channel 204 of die 200, a decreasing height H (as indicated by comparison of H' to H") and a constant length L (as indicated by comparison of L' to L") related to varying including angle β. Beneficially, an increased mass flow exchange rate is provided across the manifold width.

Geometric parameters that may affect the varying included angle, may in addition to a changing tangent height $H_T$ and a changing height H, include a changing tangent length $L_T$, a changing fillet radii R, and combinations thereof. Geometric parameter variations associated with the varying included angle and a constant, or substantially constant, length L, include a changing tangent height $H_T$, a changing height H, a changing tangent length $L_T$, a changing fillet radii R, and combinations thereof.

As described, a decreasing manifold cross-section may have a constant length L and a changing tangent length $L_T$, and the varying included angle may change related to the changing tangent length $L_T$. For this arrangement, the decreasing manifold cross-section may include a relatively smaller angle β related to a relatively smaller height H and tangent height $H_T$, and a relatively larger angle β related to a relatively larger height H and tangent height $H_T$.

Geometric parameter variations associated with a decreasing manifold cross-section, may include a constant length L and a changing tangent length $L_T$, and the varying included angle may change related to the changing tangent length $L_T$; a constant length L and a changing height H, and the varying included angle may change related to the changing height H; a constant length L and a changing tangent height $H_T$, and the varying angle may change related to the changing tangent height $H_T$; a constant length L and a changing fillet radius R, and the included angle may change related to the changing fillet radius R; and combinations thereof; and a constant length L, and the included angle change may be related to and consistent with a decreasing manifold cross-sectional area toward a manifold end.

Larger angle $β_1$ and relatively smaller angle $β_2$ of the varying transition zone beneficially provide for length L' to correspond to length L" and tangent length $L_T'$ to substantially correspond to tangent length $L_T''$. Tangent lengths $L_T'$, $L_T''$ may correspond to each other, and lengths L', L" may be different from each other, as appropriate or desired for geometrical objectives, and without unfavorably affecting the mass flow exchange rate along the stream lines flowing through manifold 305. Flow channel 304 comprises a generally curvilinear coathanger preland shape, however, if desired, may comprise generally rectilinear coathanger boundaries.

These benefits of a varying included angle in accordance with the present invention, may be obtained regardless whether the transverse flow prescription zone is a multi-stage zone or a generally coathanger-shaped zone or any other transverse flow restriction zone that provides the prescribed transverse flow distribution, and are independent of the specific locations of loci 313, 314, 316, 317. Thus, these loci have been selected, by way of example, to assist understanding.

In addition, for selected tangent heights $H_T'$, $H_T''$, an inventive varying transition zone comprising a relatively larger angle $β_1$ and a relatively smaller angle $β_2$ consistent with a decreasing manifold cross-section transverse from the manifold midline, provides a beneficial reduction in manifold pressure drop, compared to a constant transition zone angle α corresponding to angle $β_1$. Thus, relatively less shear heat may be generated and time/temperature dependent degradation may be further reduced.

Figure 12:
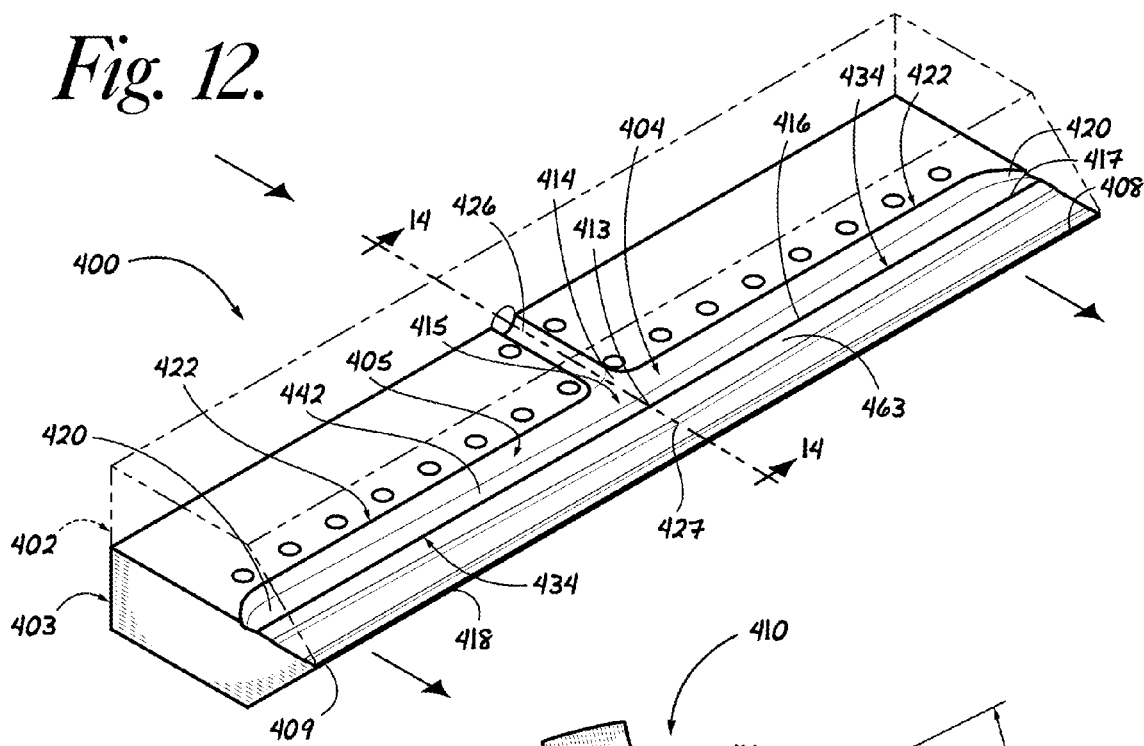
Figure 13:
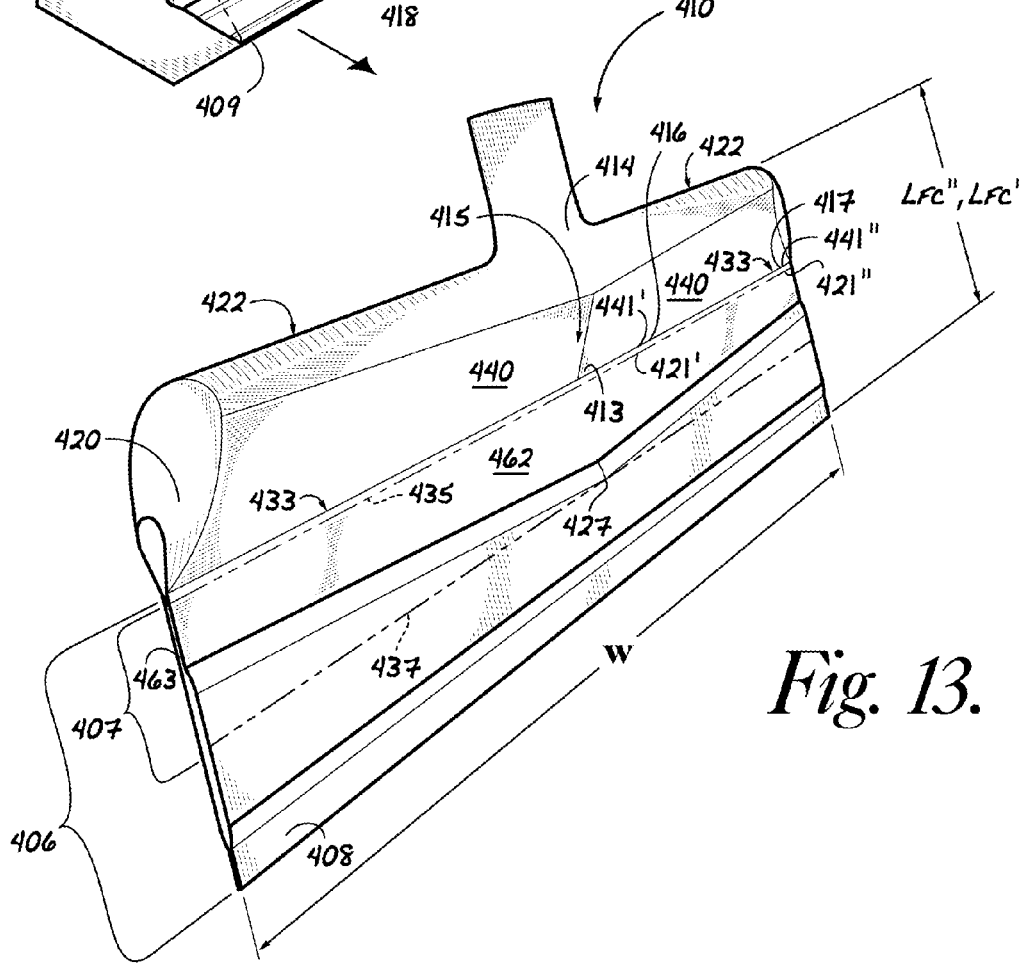
Figure 14:
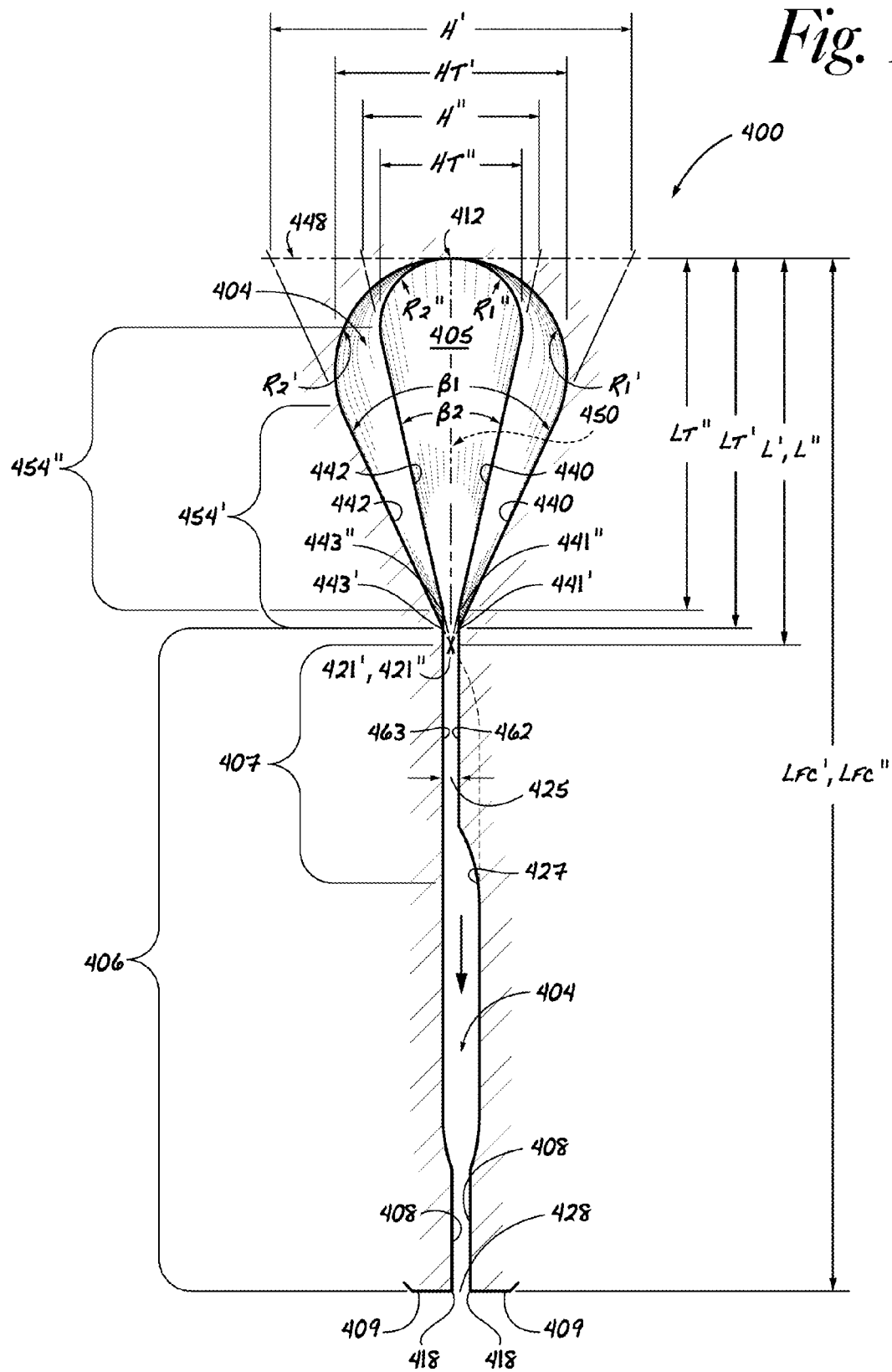
FIG. 14 is a cross-sectional view taken substantially along the centerline of the width of the extrusion die of FIG. 12, that illustrates the flow channel cross-sectional boundaries (the flow channel inlet omitted for clarity) when viewed from line 14-14.

With reference to FIGS. 12-14, and to a fourth embodiment of the invention, an abbreviated description of an extrusion die 400 is provided with reference in particular to the description of die 100 as indicated by the use of corresponding numbers and alphabetical letters to designate like parts or features. Therefore, details of die 400 that may be understood from the foregoing description, are generally not repeated.

Die 400 includes a generally teardrop-shaped, transverse flow-providing manifold 405 of a flow channel 404 having a manifold end region 420. Manifold 405 extends transversely from the midline of the manifold width, and provides for widthwise flow across the manifold width generally transverse to the main flow direction (indicated by arrows in FIG. 12). As illustrated in FIG. 13, the manifold width may substantially correspond to width W of flow channel 404.

Flow channel 404 beneficially further comprises a generally rectilinear downstream flow channel portion 406 that conveniently includes a preland channel comprising a multi-stage transverse flow restriction zone 407. Similar to previously described embodiments of the invention, flow channel 404 of die 400, as illustrated, lacks a manifold portion convenient for receiving an internal deckle. However, die 400 may be modified suitable for conveniently receiving an internal deckle, as may be understood from the description of the 6$^{th}$ embodiment of this invention.

With continued reference to FIGS. 12 and 13, loci 413, 414 selected within a region 415 of transverse flow initiation along respective flow stream lines, a locus 416 substantially ending transverse flow of a different flow stream line flowing from region 415, and a locus 417 substantially ending transverse flow of the flow stream line related to locus 414, are generally indicated. Locus 413 is selected along a flow stream line flowing through region 415. As illustrated, locus 416 is selected closer to locus 413 than locus 417 is to locus 413, or than locus 316 is to region 315. Loci 413, 414, 416 and 417, and region 415 are generally indicated in FIGS. 12 and 13.

With particular reference to FIG. 14, opposing manifold surfaces 440,442 have an angular relationship to each other, and form a transition zone 454'. Transition zone 454' comprises an angle $\beta_1$ of a varying angle $\beta$. Corresponding to angle $\beta_1$, a terminus 441' and a terminus 443' are formed by the intersection of manifold surfaces 440,442 with preland surfaces 462,463, respectively, of downstream flow channel portion 406.

Corresponding to locus 417, manifold surfaces 440,442 also form a transition zone 454". Transition zone 454" comprises an angle $\beta_2$ of varying angle $\beta$. Angle $\beta_2$ of varying angle $\beta$ is smaller than angle $\beta_1$. Angle $\beta$ is an included angle of the manifold transition zone, and varies generally transversely to the main flow direction. A terminus 441" and a terminus 443" are formed by the intersection of manifold surfaces 440,442 with preland surfaces 462,463, respectively, at locus 417. As illustrated in FIG. 14, termini 441",443" are located upstream, relative to the main flow direction, of termini 441',443'. However, termini 441",443" may, for example, be located coincident to, or downstream of, termini 441',443'.

With continued reference to FIG. 14, a datum line 448 (shown in phantom) is generally perpendicular to a bisector 450 (also shown in phantom) of varying angle $\beta$. As illustrated, bisector 450 is the bisector of angle $\beta_1$ and of angle $\beta_2$. However, as appropriate or desired, the bisector of angle $\beta_1$ and the bisector of angle $\beta_2$ may be different from each other. A manifold back wall 412 is tangent to datum line 448, and is the most upstream boundary of transverse flow-providing manifold 405 along the manifold width.

A vertex 421' is formed by the projected intersection of rectilinear manifold surfaces 440,442 of angle $\beta_1$, and a vertex 421" is formed by the projected intersection of manifold surfaces 440,442 of smaller angle $\beta_2$. As illustrated in FIG. 14, vertex 421' is coincident to vertex 421", however, as selected or determined, may be in a different location than vertex 421".

Manifold 405 includes fillet radii R. As illustrated, fillet radii $R_1'$, $R_2'$ are dimensionally equal to each other, and are coterminous with each other so as to join at upstream manifold boundary curve 422 to form a radial back wall 412. However, fillet radius $R_2'$ may be dimensionally different from fillet radius $R_1'$, and coterminous with, or for example as generally illustrated in FIG. 1, appropriately spaced apart from fillet radius $R_1'$. At locus 417, fillet radii $R_1"$, $R_2"$ are dimensionally equal to, and coterminous with, each other; however, fillet radius $R_2"$ may be dimensionally different from fillet radius $R_1"$, and coterminous with, or appropriately spaced apart from, fillet radius $R_1"$. Fillet radii $R_1"$, $R_2"$ are smaller than fillet radii $R_1'$, $R_2'$, respectively. However, fillet radii $R_1'$, $R_2'$ may dimensionally correspond to smaller fillet radii $R_1"$, $R_2"$; and in such case, fillet radii $R_1'$ and $R_2'$ may be appropriately spaced apart from each other. The appropriate fillet radii may be selected or determined to accommodate specific geometric objectives of flow channel 404.

With continued reference to FIG. 14, manifold height H' is a distance between the projected intersections of manifold surfaces 440,442 with datum line 448, and typically may be measured perpendicular to bisector 450. Tangent height $H_T'$ is the maximum distance between tangents of fillet radii R, and typically may be measured parallel to height H'. Length L' is a distance from datum line 448 to vertex 421', and may be measured parallel to bisector 450. Tangent length $L_T'$ is a distance from datum line 448 to terminus 441', and to terminus 443', and may be measured parallel to length L'. When, for example, the manifold transition zone has an overbite, terminus 441' is closer than terminus 443' to vertex 421', and the tangent length may be measured from datum line 448 to terminus 441'. Flow channel length $L_{FC}'$ is a distance from datum line 448 to exit orifice 428, and may be measured perpendicular to an exit edge 418.

Corresponding to locus 417, manifold height H" is a distance between the projected intersections of manifold surfaces 440,442 with datum line 448, and typically may be measured perpendicular to bisector 450. Tangent height $H_T"$ is the maximum distance between tangents of fillet radii R, and typically may be measured parallel to height H". Length L" is a distance from datum line 448 to vertex 421", and may be measured parallel to bisector 450. Tangent length $L_T"$ is a distance from datum line 448 to terminus 441", and to terminus 443", and may be measured parallel to length L". When, for example, the manifold transition zone has an overbite, terminus 441" is closer than terminus 443" to vertex 421", and the tangent length may be measured from datum line 448 to terminus 441". Flow channel length $L_{FC}"$ is a distance from datum line 448 to exit orifice 428, and may be measured perpendicular to an exit edge 418.

With continued reference to FIG. 14, height H' and tangent height $H_T'$ are greater than the height H" and tangent height $H_T"$, respectively. Back wall 412 is tangent to datum line 448 proximate to region 415, and at loci 416, 417. Length L' beneficially corresponds to length L", and appropriately corresponds to length L at locus 416. Tangent length $L_T'$ is greater than, but substantially corresponds to, tangent length $L_T"$, and to an appropriately corresponding tangent length $L_T$ at locus 416. However, tangent length $L_T'$ may correspond to tangent length $L_T"$, and length L' may substantially correspond to length L", or length L' and tangent length $L_T'$ may correspond to length L" and tangent length $L_T"$, respectively. Upstream manifold boundary curve 422 is beneficially generally parallel to exit orifice 428. Accordingly, this arrangement advantageously provides an $L_{FC}$ ratio of $L_{FC}'/L_{FC}"$ of 1:1, across the substantial flow channel width as beneficial to reduce differential clamshell deflection of unitary die assembly 400.

Referring in particular to mold 410 of FIG. 13, for ease of understanding, identical reference numerals indicate features of mold 410 associated with corresponding features of FIGS. 12 and 14. Furthermore, with flow channel 404 being symmetrical about the centerline of width W, like symmetrical features have been indicated with identical reference numerals. As illustrated, transition surfaces 440,442 are non-planar generally transverse to the manifold width, however, may be planar. The included angle may increment or decrement linearly or non-linearly transversely from the region of transverse flow initiation, including from the midline of the manifold width. As illustrated, the midline of the manifold width corresponds to the centerline of width W. With reference to die 400, the included angle changes linearly.

Referring to FIGS. 12 to 14, downstream flow channel portion 406 has an upstream boundary curve 433 (best seen in FIG. 13) formed by the intersection of manifold surface 440 with downstream channel surface 462 along width W of flow channel 404, and has an opposing upstream boundary curve 434 (best seen in FIG. 12). Boundary curve 433 includes terminus 441' and terminus 441". Boundary 433, and opposing boundary 434, which is formed by the intersection of manifold surface 442 with downstream channel surface 463 along width W of flow channel 404, form a boundary common to manifold 405 and flow channel portion 406. Boundary curve 434 includes termini 443', 443".

A boundary curve 435 (shown in phantom in FIG. 13) is defined, transversely from the centerline of width W, by vertices of varying angle β, including vertices 421', 421", along width W of flow channel 404. When, for example, the manifold transition zone has an overbite, boundary 433 is closer than boundary 434 to boundary 435, and the upstream boundary of flow channel portion 406 may be boundary 433. Transverse flow prescription zone 407 of flow channel portion 406 has an upstream boundary conveniently coincident to boundary 435, and has a downstream boundary 437 (shown in phantom in FIG. 13) generally parallel to boundary 435 and tangent to a locus 427 of flow channel 404.

As illustrated, rectilinear boundary curve 435 is oblique to curvilinear boundaries 433,434, and is generally parallel to an exit edge 418. Depending on the parameters selected to establish the manifold cross-sectional geometry, curvilinear boundaries 433,434 may be rectilinear, and rectilinear boundary curve 435 may be curvilinear, transverse from the centerline of flow channel W. Upstream manifold boundary curve 422 may be parallel, or substantially parallel, to boundary curve 435, and to boundary curve 433, and to exit orifice 428, as appropriate to advantageously provide a $L_{FC}$ ratio of, or about, 1:1, substantially across flow channel width W.

Tables 1,1a provide, by way of example, a matrix of geometric parameters that may be used to define the cross-sectional shape of a generally teardrop-shaped manifold widthwise between the midline and an end of the manifold width, including a back wall boundary curve related to the relationship between the fillet radii R, and including boundary curves 422, 433, 434 and 435, as well as the oblique or parallel relationship of opposing boundaries, of one another and to an exit edge 418. The changes in manifold cross-sectional geometry may be selected or derived transversely along the width of manifold 405, between region 415, including between the midline of the manifold width, and a locus substantially ending transverse flow in the manifold, including a locus terminating transverse flow in the manifold, and the changes may be linear or non-linear along the manifold width.

Beneficially, with continuing reference to FIGS. 12 to 14, transverse flow providing manifold 405 comprises between the midline and locus 417, a decreasing tangent height $H_T$, a decreasing height H, and decreasing fillet radii R, and a varying angle β consistent with a constant length L and substantially constant tangent length $L_T$. Consistent with a diminishing manifold cross-sectional area, varying angle β beneficially provides an increased mass flow exchange rate through the manifold, including improved flow channel streamlining at a locus terminating transverse flow within the manifold. In this embodiment, the included angle advantageously changes consistent with effecting a constant, or substantially constant, length L, and consistent with a changing manifold cross-sectional area. Geometric parameters that may affect the varying included angle, may include a constant length L, a changing tangent length $L_T$, a changing height H, a changing tangent $H_T$, and a changing fillet radius R, and combinations thereof.

Geometric parameter variations associated with the varying included angle and a constant, or substantially constant, length L, include a changing tangent length $L_T$, related to change of the varying included angle; a changing tangent height $H_T$, and the varying included angle may change related to the changing tangent height $H_T$; a changing height H, and the varying angle may change related to the changing height H; a changing fillet radius R, and the varying included angle may change related to the changing fillet radius R; and combinations thereof.

In general accordance with the foregoing, a structurally beneficial $L_{FC}$ ratio of, or about, 1:1 advantageously provides reduced differential clamshell deflection. Tangent lengths $L_T'$, $L_T''$ may correspond to each other, and lengths L', L" may be different from each other, as selected or determined for geometrical objectives, and without unfavorably affecting the $L_{FC}$ ratio, or deleteriously affecting the mass flow exchange rate through the manifold.

Geometric parameter variations associated with the decreasing manifold cross-sectional area and a constant, or substantially constant, length L include a changing tangent length $L_T$, related to change of the varying included angle; a changing tangent height $H_T$, and the varying included angle may change related to the changing tangent height $H_T$; a changing height H, and the varying angle may change related to the changing height H; a changing fillet radius R, and the varying included angle may change related to the changing fillet radius R; and combinations thereof.

Change of the varying included angle with respect to a changing manifold cross-section, is beneficially related to change of the manifold transition zone. The change of the varying included angle may be a linear or a non-linear change transversely between region 415 and locus 416, and locus 417. The included angle may decrease toward a manifold end, and at least one of the opposing transition surfaces of the manifold transition zone may increase in length in the main flow direction. Also related to change of the transition zone, the manifold may change transversely from region 415 of transverse flow initiation and length L may remain constant or substantially constant. Benefits of a changing manifold cross-section associated with the inventive varying included angle include reduced transition stagnation, reduced manifold residence time, and reduction in differential clamshell deflection.

In addition, the manifold may have a decreasing cross-sectional area having a constant, or substantially constant, tangent length $L_T$, and the changing transition zone may include a relatively larger included angle β and a relatively smaller included angle β that are related to a substantially constant, or constant, tangent length $L_T$, or the manifold may have a decreasing cross-sectional area having a constant, or substantially constant, length L, and the changing transition zone may include a relatively larger included angle β and a relatively smaller included angle β that are advantageously consistent with a constant, or substantially constant, length L. Larger angle $β_1$ and smaller angle $β_2$ of the varying transition zone are beneficially consistent with length L' and corresponding length L", and related to tangent length $L_T'$, $L_T''$. Thus, a structurally beneficial $L_{FC}$ ratio of 1:1 advantageously provides reduced differential clamshell deflection. Tangent lengths $L_T'$, $L_T''$ may correspond to each other, and lengths L', L" may be different from each other, as selected or determined for geometrical objectives, and without unfavorably affecting the $L_{FC}$ ratio, or deleteriously affecting the exchange rate of the mass flowing through manifold 405.

These benefits are independent of the specific locations of selected loci, including loci 413, 414, 416 and 417. To provide an $L_{FC}$ ratio of, or about, 1:1, an extrusion die in accordance with this embodiment advantageously comprises 1) a decreasing manifold cross-sectional area between a region of transverse flow initiation, including between the manifold midline, and a locus substantially ending transverse flow within the manifold, 2) the decreasing cross-section manifold having a transition zone comprising a varying included angle β corresponding to a constant or substantially constant length L, and 3) a generally rectilinear downstream channel portion. Thus, the loci have been selected to assist, by way of example, understanding of the invention. Beneficially, angle β decreases and lengths L' and L" may remain constant, or substantially constant, relative to each other.

In addition, for selected tangent heights $H_T'$, $H_T"$, the inventive transition zone comprising a relatively larger angle $β_1$ and a relatively smaller angle $β_2$ consistent with a decreasing manifold cross-section transverse from the manifold midline, provides a beneficial reduction in manifold pressure drop, compared to an constant transition zone angle α corresponding to the angle $β_1$. Thus, relatively less shear heat may be generated and time/temperature dependent degradation may be further reduced. Furthermore, this inventive embodiment may provide a reduction in differential clamshell deflection while beneficially providing a relatively greater mass flow exchange rate at, and proximate to, an end region of the manifold.

With respect to the foregoing embodiments (FIGS. 3-14), a generally teardrop-shaped manifold has been conveniently used to describe the invention. However, as can be appreciated by a skilled artisan, the invention also applies to a manifold comprising a generally extended cross-sectional shape in general accordance with the geometric parameters included in Tables 2,2a (which follow the description of extrusion die 500 of FIGS. 15-17), or other suitable manifold cross-sectional shapes that include a transition zone comprising the inventive included varying angle. Change of the varying included angle is beneficially related to change of the manifold shape.

When processing multi-layer coextrusions through an extrusion die flow channel, a manifold comprising an extended length provides improved uniformity of the individual layers across the flow channel width due to reduced transition stagnation affects. However, with some time/temperature-sensitive polymers, such as for example polyamide, an extended manifold cross-section that spans the entire manifold width, may result in polymer degradation. To overcome this and like problems, an extrusion die comprising an included varying angle in accordance with the invention, is beneficially characterized by a cross-over manifold shape.

Figure 15:
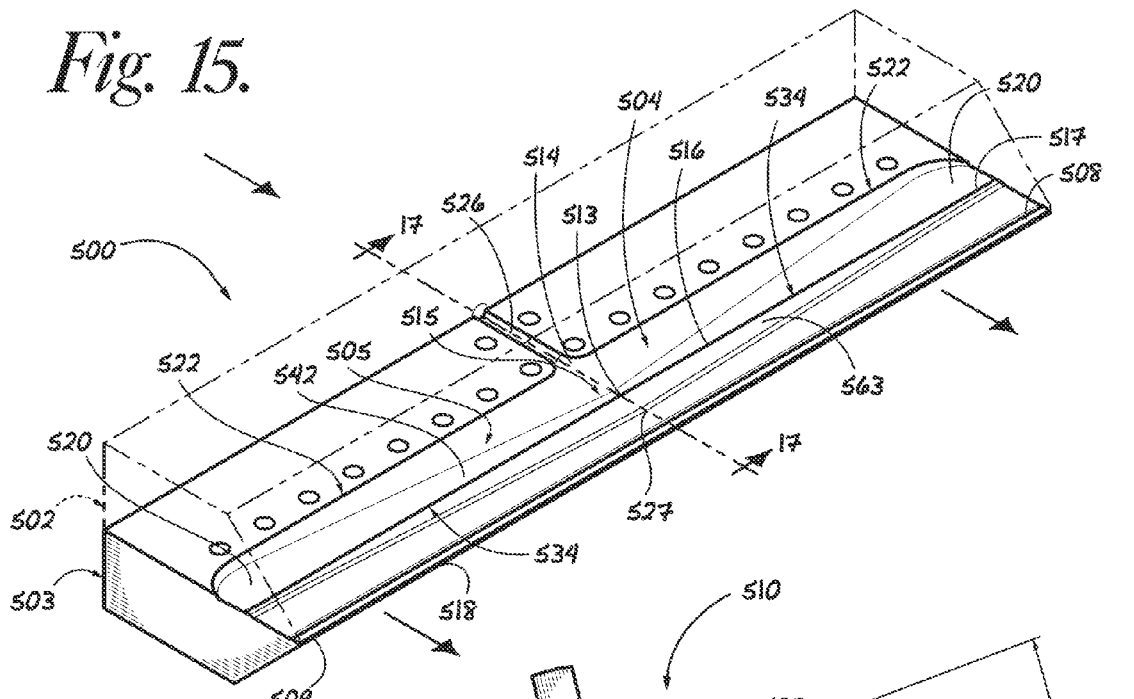
Figure 16:
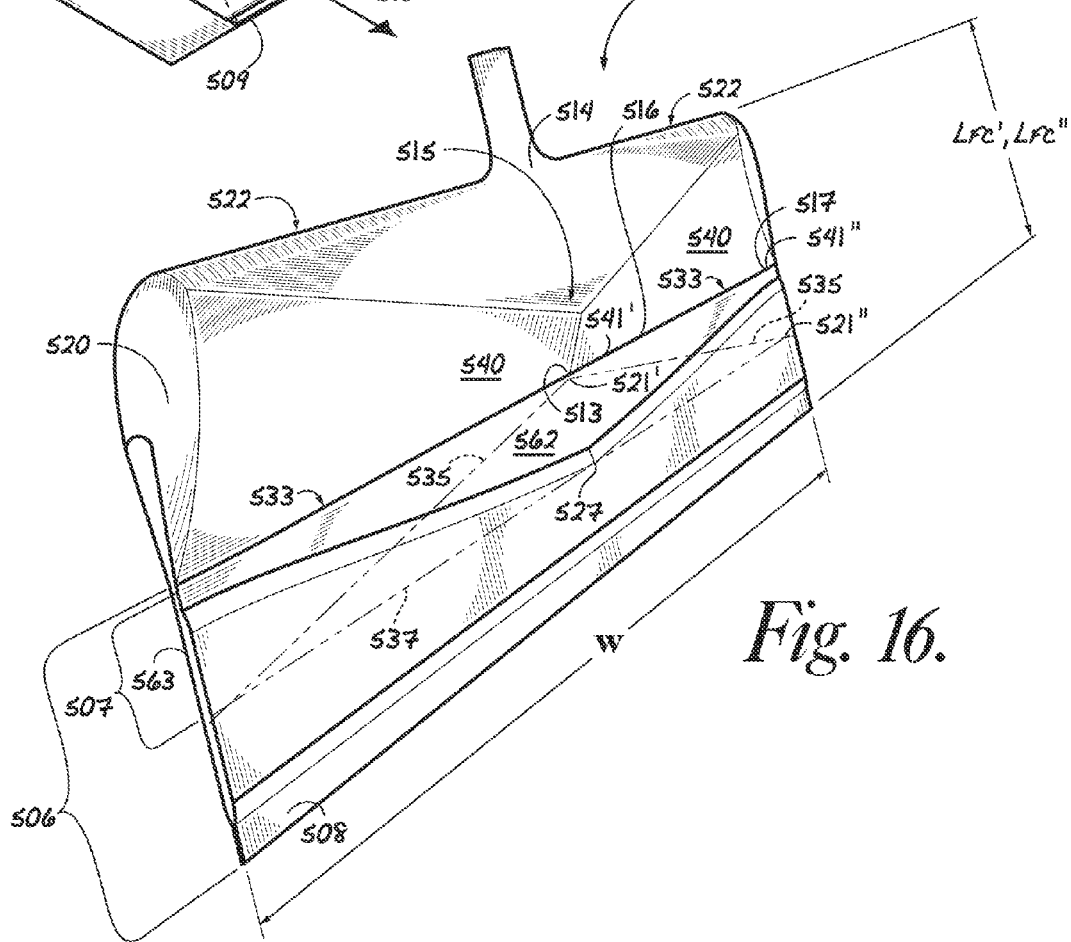
Figure 17:
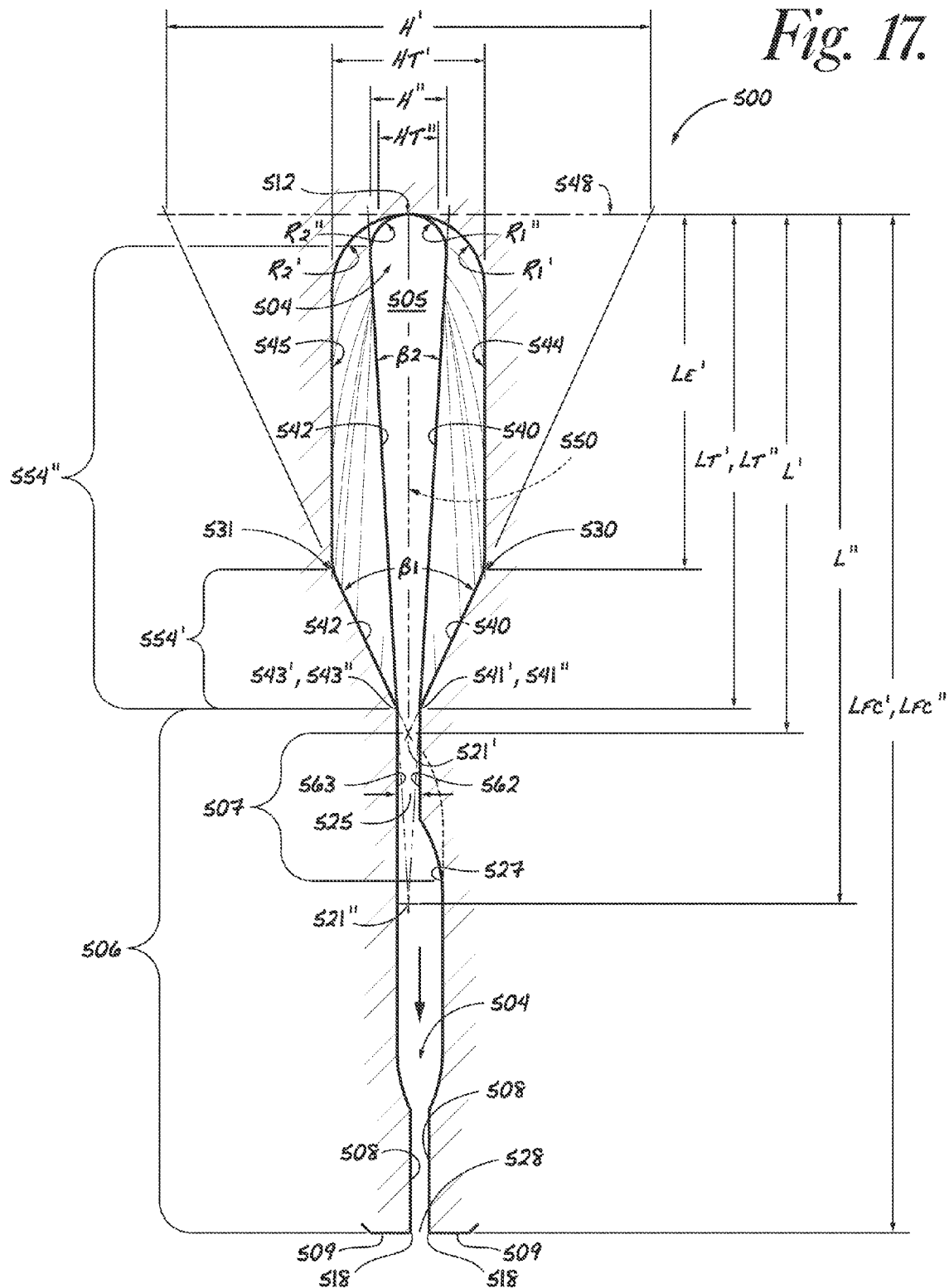
FIG. 17 is a cross-sectional view taken substantially along the centerline of the width of the extrusion die of FIG. 15, that illustrates the flow channel cross-sectional boundaries (the flow channel inlet omitted for clarity) when viewed from line 17-17.

With reference to FIGS. 15-17, and to a fifth embodiment of the invention, an abbreviated description of an extrusion die 500 including a flow channel 504, is provided with particular reference to the description of die 400 as indicated by the use of corresponding numbers and alphabetical letters to designate like parts or features. For sake of brevity, therefore, details of die 500 that may be understood from the description of die 400, are generally not repeated. Similar to the previously described embodiments of the invention, flow channel 504 of die 500, as illustrated, lacks a manifold portion convenient for receiving an internal deckle. However, die 500 may be modified suitable for conveniently receiving an internal deckle as may be understood from the description of the 6$^{th}$ embodiment of this invention.

Loci 513, 514 selected within a region 515 (generally indicated in FIGS. 15 and 16) of transverse flow initiation and along respective flow stream lines, a locus 516 substantially ending transverse flow of a different flow stream line flowing from region 515, and a locus 517 substantially ending transverse flow of the flow stream line related to locus 514 are generally indicated in FIGS. 15 and 16. Locus 513 is selected along a flow stream line flowing through region 515. As illustrated, locus 516 is selected closer to locus 513 than locus 517 is to locus 513, or than locus 416 is to locus 413.

In a first aspect of this embodiment, die 500 includes a crossover transverse flow-providing manifold 505, that may be generally characterized by a cross-sectional shape having an extended surface, that transitions transversely from the midline of the manifold width to a generally teardrop shape at a locus substantially ending transverse flow of a flow stream line, including at locus 517, or at a selected locus terminating transverse flow in the manifold. As illustrated in FIG. 16, the manifold width may substantially correspond to width W of flow channel 504. Flow channel 504 beneficially comprises a downstream flow channel portion 506 that conveniently includes a preland channel comprising a multi-stage transverse flow restriction zone 507.

An extrusion die in accordance with the first aspect of this embodiment, beneficially has a generally elongated manifold cross-section comprising an extended length $L_E$ (as hereinafter defined) including extended surfaces 544,545, and transition surfaces 540,542 adapted to transform the generally extended cross-sectional shape to a generally teardrop-shaped cross-section transversely therefrom, including at a locus substantially ending transverse flow of a flow stream line in the manifold. More generally, a cross-over manifold in accordance with the invention, may have a manifold cross-section having a first cross-sectional shape at a first locus, such for example a cross-sectional shape selected and determined by geometric parameters of Tables 2,2a, and a second cross-sectional shape at a second locus, such as for example a cross-sectional shape selected and determined by geometric parameters of Tables 1,1a. Two distinctly different manifold cross-sectional shapes are beneficially selected from two separately defined sets of geometric parameters, such as, by way of example, Tables 1,1a and Tables 2,2a. Change of the varying included angle is beneficially related to transformation of the manifold shape.

A vertex 521' is formed by the projected intersection of rectilinear transition surfaces 540,542 of angle $β_1$, and a vertex 521" is formed by the projected intersection of manifold surfaces 540,542 of relatively smaller angle $β_2$. As illustrated in FIG. 17, termini 541",543" are coincident to termini 541',543', respectively. However, termini 541",543" may, for example, be located upstream, or downstream, of termini 541',543'. As further illustrated in FIG. 17, vertex 521" of angle $β_2$ is spaced apart from and located downstream of vertex 521' of angle $β_1$; furthermore as appropriate or desired, the vertices may be in a different location than illustrated, such as when, for example, vertex 521' is coincident to vertex 521", or the bisector of angle $β_1$ and the bisector of angle $β_2$ are oblique to one another.

Vertices 530,531 are formed by the intersection of extended surfaces 544,545 with transition surfaces 540,542 of manifold 505, respectively. A flow-streamlining fillet radius may typically be coterminous with each of extended surfaces 544,545 and transition surfaces 540,542, respectively. In such case, vertices 530,531 are formed by the projected intersection of opposing surfaces 544,545 with transition surfaces 540,542, respectively.

Manifold 505 includes optional fillet radii R. Reference should be made to the corresponding description related to fillet radii R of die 400, with respect to optional fillet radii R of manifold 505.

With continued reference to FIG. 17, reference should be made to the corresponding description related to datum line 448, height H, length L, tangent length $L_T$ and flow channel length $L_{FC}$ of die 400, with respect to datum line 548, height H, length L, tangent length $L_T$, and flow channel length $L_{FC}$ of flow channel 504. Tangent height $H_T'$ is a distance defined by the shortest distance between extended surfaces 544,545, and typically may be measured parallel to height H'. As illustrated, extended surfaces 544,545 are rectilinear along the main flow direction; however, surfaces 544,545 may be curvilinear. Extended length $L_E'$ is a distance from datum line 548 to vertex 530, and to vertex 531, and includes an extended surface 544, and may be measured parallel to length L'. Tangent height $H_T''$ is a distance defined by the maximum distance between tangents of fillet radii R, and may be measured parallel to height H''.

With continued reference to FIG. 17, tangent length $L_T'$ advantageously corresponds to tangent length $L_T''$ at locus 517, and appropriately corresponds to tangent length $L_T$ at locus 516. Upstream manifold boundary curve 522 may advantageously be generally parallel to exit orifice 528. Beneficially, this arrangement provides an $L_{FC}$ ratio ($L_{FC}'/L_{FC}''$) of, or about, 1:1. Advantageously, manifold 505 is transformed from a cross-sectional shape having an extended length $L_E$ to a generally teardrop cross-sectional shape, related to change of varying including angle β.

Geometric parameters useful for defining the manifold cross-sectional shape beginning within region 515 may be selected and determined from Tables 2,2a; and the geometric parameters useful for defining the manifold cross-sectional shape at locus 517, may be selected and determined from Tables 1, 1a, 2, 2a. Typically, transition angle β decreases from within region 515 toward an end 520 of manifold 505. The geometric parameters useful for defining the shapes of the manifold cross-section between the midline of the manifold width and locus 517, including locus 516, and a manifold end 520, may be selected from Tables 1, 1a, 2, 2a.

Referring in particular to mold 510 of FIG. 16 for ease of understanding, identical reference numerals indicate features of mold 510 associated with corresponding features of FIGS. 15 and 17. Furthermore, with flow channel 504 being symmetrical about the centerline of width W, like symmetrical features have been indicated with identical reference numerals. As illustrated, transition surfaces 540,542 are non-planar generally transverse to the manifold width, however, may be planar. With reference to 500, the included angle varies non-linearly transversely from region 15, including from the midline of the manifold width.

Referring to FIGS. 15 to 17, boundary curve 533 (best seen in FIG. 16) and opposing boundary curve 534 (best seen in FIG. 15) form a boundary common to manifold 505 and flow channel portion 506. Boundary curve 533 includes termini 541',541", and boundary curve 534 includes termini 543', 543". Transverse flow prescription zone 507 of flow channel portion 506 has an upstream boundary spaced apart, as illustrated, from boundary curve 533, and conveniently coincident to vertex 521, and generally parallel to an exit edge 518. A downstream boundary 537 (shown in phantom in FIG. 16) of zone 507 is generally parallel to an exit edge 518 and tangent to a locus 527 of flow channel 504.

As illustrated, boundary curves 533,534 are generally parallel to an exit edge 518. Depending on the parameters selected to establish the manifold cross-sectional geometry, rectilinear boundaries 533,534 may be curvilinear, and curvilinear boundary curve 535 (which is defined by vertices, including vertices 521, 521', of varying angle β) may be rectilinear from the centerline to an end of the flow channel. Upstream manifold boundary curve 522 may be parallel, or substantially parallel, to boundary curve 533, and to exit orifice 528, as appropriate to advantageously provide an $L_{FC}$ ratio of, or about, 1:1, across the substantial width W of the flow channel, as structurally beneficial to reduce differential clamshell deflection of unitary die assembly 500.

Tables 1,1a and 2,2a collectively provide, by way of example, a matrix of geometric parameters that may be used to define the cross-sectional shape of a cross-over type manifold widthwise between the midline and an end of the manifold width, including a back wall boundary curve related to the relationship between fillet radii R, and including boundary curves 522, 533, 534 and 535, as well as the oblique or parallel relationship of boundaries, including of opposing boundaries, to one another, and to an exit edge 518. The changes in manifold cross-sectional geometry may be selected or derived transversely along the width of manifold 505, between region 515, including between the midline of the manifold width, and a locus substantially ending transverse flow in the manifold, including a locus terminating transverse flow in the manifold, and the changes may be linear or non-linear along the manifold width.

Beneficially, with continuing reference to FIGS. 15 to 17, transverse flow-providing manifold 505, between the manifold midline and locus 517, transitions from a cross-sectional shape including an extended length $L_E$, to a generally teardrop cross-sectional shape, related to change of varying angle β. Advantageously, manifold 505 comprises a diminishing cross-sectional area between the manifold midline and locus 516, and locus 517, substantially ending transverse flow of the respective stream lines. However, the transition from a cross-sectional shape including an extended length $L_E$, to a generally teardrop cross-sectional shape may be between region 515 and locus 516.

Consistent with the diminishing cross-sectional area, varying angle β beneficially provides an increased mass flow exchange rate along trajectories of stream line paths, including from region 515 to locus 516, and to locus 517, including improved flow channel streamlining at a locus terminating transverse flow in the manifold. Advantageously, in this embodiment, the included angle changes consistent with effecting a constant, or substantially constant, tangent length $L_T$, and consistent with a changing manifold cross-sectional area. Geometric parameters that may affect the varying included angle, may include a constant, or substantially constant, tangent length $L_T$, a changing height H, a constant or changing tangent height $H_T$, a changing length L, a changing extended length $L_E$, and a constant or changing fillet radius R, and combinations thereof.

Geometric parameter variations associated with the varying included angle and a constant, or substantially constant, tangent length $L_T$ include a changing length L, related to change of the varying included angle; a changing tangent height $H_T$, and the varying included angle may change related to the changing tangent height $H_T$; a changing extended length $L_E$, and the varying angle may change related to the changing extended length $L_E$; a changing height H, and the varying angle may change related to the changing height H; a changing fillet radius R, and the varying included angle may change related to the changing fillet radius R; and combinations thereof.

In general accordance with the foregoing, a structurally beneficial $L_{FC}$ ratio of, or about, 1:1 may advantageously be provided. Tangent lengths $L_T'$, $L_T''$ may correspond to each other, and lengths L', L'' may be different from, or the same as, each other, as selected or determined for geometrical objectives, and without unfavorably affecting the $L_{FC}$ ratio, or deleteriously affecting the exchange rate of the mass flowing through manifold 505.

Geometric parameter variations associated with the decreasing manifold cross-sectional area and a constant, or substantially constant, tangent length $L_T$ include a changing length L, related to change of the varying included angle; a changing tangent height $H_T$, and the varying included angle may change related to the changing tangent height $H_T$; a changing extended length $L_E$, and the varying angle may change related to the changing extended length $L_E$; a changing height H, and the varying angle may change related to the changing height H; a changing fillet radius R, and the varying included angle may change related to the changing fillet radius R; and combinations thereof. Thus, a structurally beneficial $L_{FC}$ ratio of, or about, 1:1 is provided. Tangent lengths $L_T'$, $L_T''$ may correspond to each other, and lengths L', L'' may be different from, or the same as, each other, as selected or determined for geometrical objectives, without unfavorably affecting the $L_{FC}$ ratio, or deleteriously affecting the mass flow exchange rate.

Change of the varying included angle with respect to a changing manifold cross-section, is beneficially related to change of the manifold transition zone. The change of the varying included angle may be a linear or a non-linear change transversely between region 515 and locus 516, and locus 517. The included angle may decrease toward a manifold end, and at least one of the opposing transition surfaces of the manifold transition zone may increase in length in the main flow direction.

Also related to change of the transition zone in a second aspect of this embodiment, beneficially the manifold may change transversely from region 515 having a generally extended cross-sectional shape including an extended length $L_E$, to a generally extended cross-sectional shape including a relatively shorter extended length $L_E$, and the tangent length $L_T$ may remain constant, or substantially constant, related to change of varying angle β. In this inventive embodiment, an extended manifold surface may correspond to the entirety of, or a portion of, the extended length $L_E$, depending upon, for example, whether the manifold cross-section includes optional fillet radii R coterminous with the extended manifold surface.

Change of the included angle β with respect to a changing manifold cross-section is beneficially related to transformation of the manifold shape. The included angle may decrease toward a manifold end, and one of the opposing transition surfaces of a generally tear drop-shaped cross-section may be longer than one of the opposing transition surfaces of a generally extended cross-sectional shape, in the main flow direction. Alternatively, the included angle may increase toward a manifold end.

Also related to transformation of the manifold shape, the included angle may decrease toward a manifold end, and one of the transition surfaces may change in length in the main flow direction, and the change in length may be linear or non-linear. Furthermore, change of the included angle is beneficially consistent with decrease of the manifold cross-sectional area and related to a constant, or substantially constant, tangent length $L_T$. Moreover, the changing transition zone may include a relatively larger angle β and a relatively smaller angle β that are related to a constant, or substantially constant, tangent length $L_T$.

Angle β of the cross-over manifold includes an angle $β_1$ and an angle $β_2$ that are respectively beneficially related to a constant, or substantially constant, tangent length $L_T$ across width W, thereby providing for a generally parallel relationship of manifold boundary curve 522 to an exit edge 518. In this way, a structurally beneficial $L_{FC}$ ratio of, or about, 1:1 may be provided.

Benefits of the inventive varying included angle of this embodiment, include reduced transition stagnation associated with an extended length $L_E$ (beneficial to multilayer coextrusion), reduced manifold residence time associated with a diminishing manifold cross-sectional area, increased mass exchange rates along stream line trajectories flowing through the manifold and including at locus 517, enhancement of stream line flow associated with a smaller included transition angle associated with the diminishing manifold cross-section, and reduction in differential clamshell deflection. These benefits are independent of the specific locations of selected loci 513, 514, 516, 517; thus, the loci have been selected to assist, by way of example, understanding of the invention.

An extrusion die in general accordance with this embodiment, comprises a transition zone adapted to transform the manifold from a first cross-sectional shape including an extended length $L_E$, to a second cross-sectional shape, comprising a constant, or substantially constant, tangent $L_T$ transverse across the manifold width accommodated by a varying included angle.

While a cross-over manifold has been primarily described, like benefits may be obtained by the second aspect of this embodiment, wherein the generally extended manifold cross-sectional shape extends from the manifold midline to a second locus 516, or to a second locus 517, or to a locus terminating transverse flow in the manifold, or to any locus there between, any of which having a relative shorter extended length $L_E$ as compared to an extended length $L_E$ within region 515; provided that the manifold beneficially includes a transition zone comprising an included varying angle in accordance with the invention, to provide a constant, or substantially constant, tangent length $L_T$. A generally extended manifold may lack back wall optional radius R, in which case, one or both of extended surfaces 544, 545 may be coterminous with the manifold back wall 512, and the manifold may, for example, have a generally rectangular shape.

For a manifold having a generally extended cross-sectional shape in accordance with the invention, useful geometric parameters for defining the manifold cross-sectional shapes include H, $H_T$, L, $L_E$, $L_T$, optionally R, and an included angle that beneficially may vary transversely from the manifold midline. Radius R is an optional parameter (indicated in Tables 2, 2a by "O") of a generally extended cross-sectionally-shaped manifold, including of a generally rectangular-shaped manifold. A combination of parameters may be selected (indicated by "S") to derive other parameters (indicated by "D") to define the manifold cross-sectional geometry across its transverse width, as generally illustrated in Tables 1,1a, 2,2a. Accordingly, there are multiple ways by which the manifold cross-sectional shapes may be defined without deviating from the invention.

The transition zone included angle may be selected or derived across the manifold width. By way of example, Tables 1,1a and Tables 2,2a provide illustrations of selected (S), derived (D), or optional (O) parameters from which the increment or decrement of varying angle β and change of other geometric parameters, are selected or may be derived for a manifold in accordance with the present invention. For purposes of Tables 2,2a, "β" relates a varying included angle corresponding to a varying transition zone in accordance with the present invention, and "α" relates to a transition zone comprising a non-varying, constant included angle.

TABLE 2

(Generally Extended Cross-Sectional Shape Manifold)

| H | D | D | D | D | D | D | D | D | D | D |
|---|---|---|---|---|---|---|---|---|---|---|
| $H_T$ | D | D | D | D | S | S | S | S | S | S |
| L | D | S | S | S | D | D | D | S | S | S |
| $L_T$ | S | D | S | S | D | S | S | D | D | S |
| $L_E$ | S | S | D | S | S | D | S | D | S | D |
| β, α | S | S | S | D | S | S | D | S | D | D |
| R | O | O | O | O | O | O | O | O | O | O |

TABLE 2a

| H | S | S | S | S | S | S | S | S | S | S |
|---|---|---|---|---|---|---|---|---|---|---|
| $H_T$ | D | D | D | D | D | D | S | S | S | S |
| L | D | D | D | S | S | S | D | D | D | S |
| $L_T$ | D | S | S | D | D | S | D | D | S | D |
| $L_E$ | S | D | S | D | S | D | D | S | D | D |
| β, α | S | S | D | S | D | D | S | D | D | D |
| R | O | O | O | O | O | O | O | O | O | O |

The foregoing embodiments illustrate, by way of general example, various flow channel arrangements related to the inventive varying included angle, including: a constant tangent height $H_T$ and the manifold cross-section changes related to change of the varying included angle; a constant height H, and the manifold cross-section changes related change of the varying angle; a constant length L, and the varying angle changes related change of the manifold cross-section; a constant tangent length $L_T$, and the manifold cross-section changes related change of the varying angle; a constant fillet radius R, and the manifold cross-section changes related to the varying angle; and combinations thereof. As may be understood by a skilled artisan, the inventive varying angle associated with various flow channel arrangements, provides unique latitude of design in accommodating improved process and structural objectives. This benefit is independent of the downstream flow channel portion.

Figure 18:
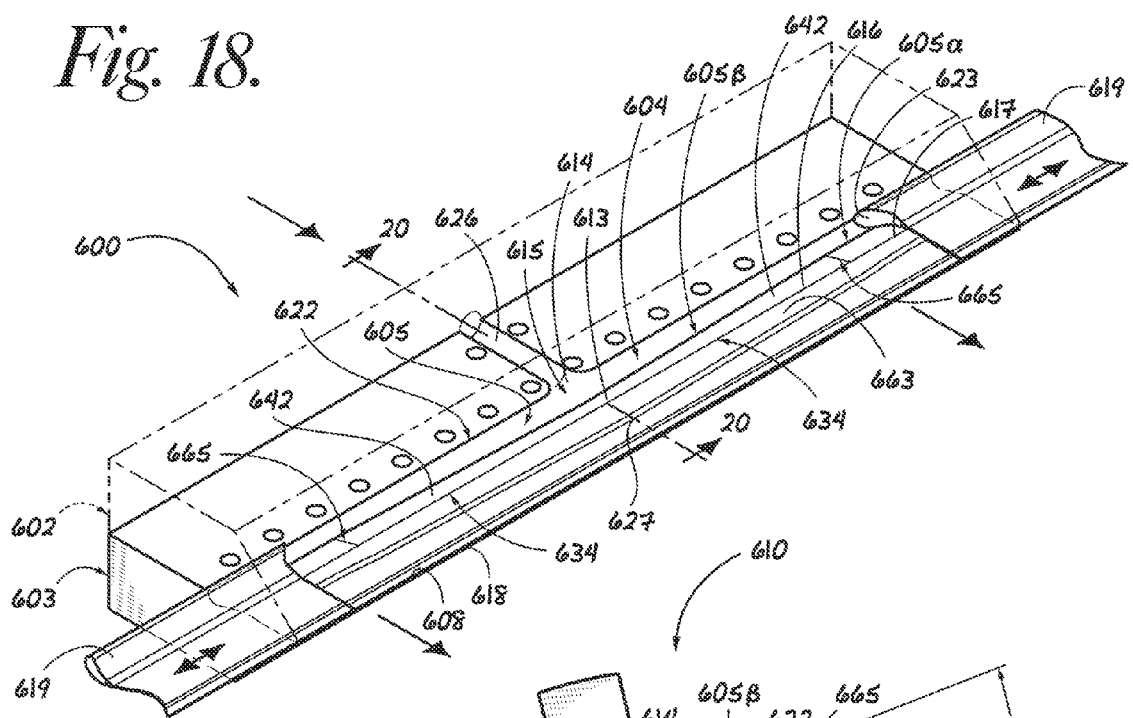
Figure 19:
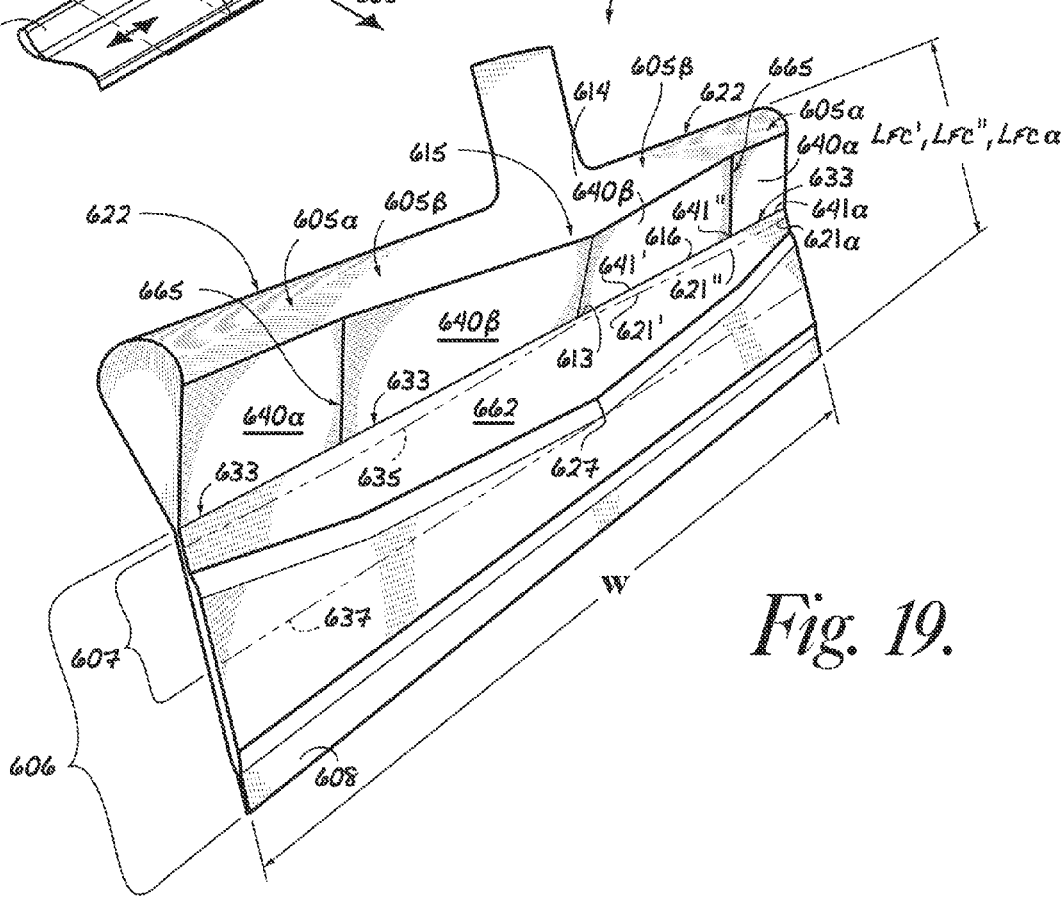
Figure 20:
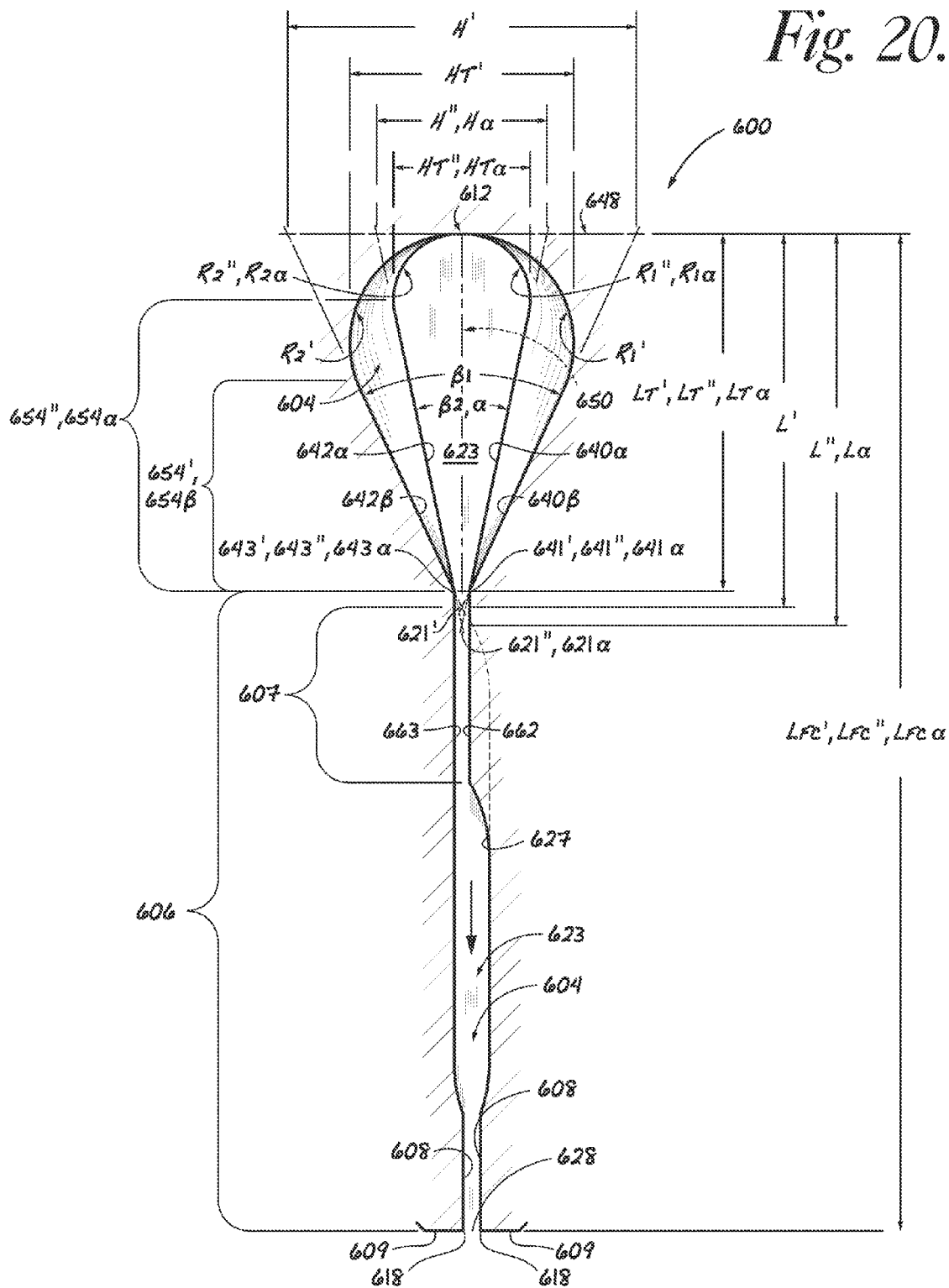
FIG. 20 is a cross-sectional view taken substantially along the centerline of the width of the extrusion die of FIG. 18, that illustrates the flow channel cross-sectional boundaries (the flow channel inlet omitted for clarity) when viewed from line 20-20.

With reference to FIGS. 18 to 20, and to a sixth embodiment of the invention, an abbreviated description of an extrusion die 600 is provided with particular reference to the description of die 400 as indicated by the use of corresponding numbers and alphabetical letters to designate like parts or features. As indicated, die 600 is a modified version of die 400, with a primary difference being that flow channel 604, including a multi-stage manifold 605, is structurally suitable for internal deckles, including deckles as generally illustrated by U.S. Pat. No. 5,505,609 to Cloeren et al., and U.S. Pat. No. 5,451,357 to Cloeren, and as diagrammatically illustrated in FIGS. 2, 18, and the like.

With respect to this primary difference, transverse flow-providing multi-stage manifold 605 suitably comprises a first manifold portion 605β comprising a transition zone section β including a varying included angle β, and a second manifold portion 605α comprising a transition zone section α including a constant included angle α suitable for receiving internal deckles 619. Transition zone section β generally corresponds to the transition zone of die 400, which comprises angle $β_1$ and relatively smaller angle $β_2$ of varying angle β. Thus, details of die 600 that may be understood from the description of die 400 are typically not repeated. Transition zone sections β and α of manifold 605 are coterminous to each other; and the intersection of transition zone section β and a transition zone section α defines a coterminous boundary 665 delineating first manifold portion 605β from second manifold portion 605α. As illustrated in FIG. 19, the width of manifold 605 may substantially correspond to width W of flow channel 604.

Flow channel 604 conveniently comprises a generally rectilinear downstream flow channel portion 606 that conveniently includes a multi-stage transverse flow restriction zone 607. However, as appropriate or desired, downstream channel portion 606 may, for example, alternatively include a coathanger transverse flow restriction zone portion corresponding to the manifold portion comprising transition zone section β.

Loci 613,614 selected within a region 615 (generally indicated in FIGS. 18 and 19) of transverse flow initiation and along respective flow stream lines, a locus 616 substantially ending transverse flow of a different flow stream line flowing from region 615, and a locus 617 substantially ending transverse flow of the flow stream line related to locus 614, are generally indicated in FIGS. 18 and 19. Locus 613 is selected along a stream line flowing through region 615. As illustrated, locus 616 is selected closer to locus 613 than locus 617 is to locus 613. The loci have been selected by way of general illustration.

With reference to transition zone section β, opposing manifold surface portions 640β,642β have an angular relationship to each other, and beginning within region 615 and ending at boundary 665, form a varying transition zone 654β comprising varying angle β. A terminus 641" and a terminus 643" are formed by the intersection of manifold surface portions 640β, 642β with preland surfaces 662,663, respectively, at boundary 665. Varying transition zone 654β comprises an angle $β_1$ corresponding to termini 641',643', and an angle $β_2$ corresponding to termini 641", 643".

The manifold portion comprising transition zone section α is suitably adapted to receive deckle 619 within the manifold. The deckle may be disposed within flow channel 604, and beneficially may be slidably disposed, and have a close fit relationship along the width of the flow channel portion corresponding to the manifold portion comprising transition zone section α. When deckle 619 is slidably disposed in manifold 605, an end 623 of the deckle defines a movable locus terminating transverse flow within the manifold. Locus 617 is proximate to, or at, deckle end 623.

With reference to transition zone section α, opposing manifold surface portions 640α,642α have an angular relationship to each other, and form transition zone 654α coterminous with varying transition zone 654β at boundary 665. A terminus 641α and a terminus 643α are formed by the intersection of manifold surface portions 640α,642α with preland surfaces 662,663, respectively, of downstream flow channel portion 606 along the width of transition zone section α. As described, transition zone 654α comprises a constant included angle α along its width. Manifold surface portions 640β,642β at boundary 665 beneficially correspond to manifold surface portions 640α,642α, respectively, to advantageously provide streamlined transition from the first manifold portion to the second manifold portion.

With reference to FIG. 20, a datum line 648 (shown in phantom) is generally perpendicular to a bisector 650 (also shown in phantom) of angle $β_1$, of angle $β_2$, and of constant angle α. However, as appropriate or desired, the bisector of angle $β_1$, and the bisector of angle $β_2$, and the bisector of angle α may be different from each other; and the bisector of varying angle β may be different than the bisector of constant angle α.

A vertex 621α is formed by the projected intersection of rectilinear manifold surfaces 640α,642α of angle α. As illustrated in FIG. 20, vertex 621α is coincident to vertex 621" of varying angle β.

As indicated, manifold portion 605β comprising transition zone section β, generally corresponds to manifold 405 of die 400 of FIG. 14. Thus, reference should be made to the corresponding description related to fillet radii R of die 400, with respect to fillet radii R of this portion of manifold 605, including to a boundary 665 (instead of locus 417 of die 400).

With continued reference to FIG. 20, manifold portion 605α comprising transition zone section α, comprises fillet radii $R_1α,R_2α$. Fillet radii $R_1α,R_2α$ are dimensionally equal to, however, may be different from, fillet radii $R_1",R_2"$, respectively. Fillet radii $R_1α,R_2α$ are dimensionally equal to each other, and may be spaced apart from each other, or may be dimensionally different from each other. Fillet radii $R_1α$, $R_2α$ may be coterminous with each other. The appropriate fillet radii may be selected or determined to accommodate specific geometric objectives of flow channel 604.

As stated, manifold portion 605β comprising transition zone section β, generally corresponds to manifold 405 of die 400 of FIG. 14. Thus, reference should be made to the corresponding description related to height H, tangent height $H_T$, length L, tangent length $L_T$ and flow channel length $L_{FC}$ of die 400, with respect to height H, tangent height $H_T$, length L, tangent length $L_T$, and flow channel length $L_{FC}$ of this portion of flow channel 604, including to a boundary 665 (instead of locus 417 of die 400).

With continued reference to FIG. 20, and with reference to manifold portion 605α comprising transition zone section α from boundary 665 to an end of the manifold, manifold height Hα is a distance between the projected intersections of manifold surfaces 640α,642α with datum line 648, and typically may be measured perpendicular to bisector 650. Tangent height $H_Tα$ is the maximum distance between tangents of fillet radii R, and typically may be measured parallel to height Hα. Length Lα is a distance from datum line 648 to vertex 621α, and may be measured parallel to bisector 650. Tangent length $L_Tα$ is a distance from datum line 648 to terminus 641", and to terminus 643", and may be measured parallel to length Lα. Flow channel length $L_{FC}α$ is a distance from datum line 648 to exit orifice 628, and may be measured perpendicular to an exit edge 618. According, the manifold portion comprising transition zone section α comprises a constant cross-section manifold portion conveniently suitable for receiving deckle member 619. Advantageously, $L_{FC}α, L_{FC}"$ conveniently correspond to each other.

Height H' and tangent height HT' are greater than heights H", Hα, and the tangent height HT at locus 616, at boundary 665, and at locus 617, respectively. Back wall 612 proximate to region 615, and at locus 616, and at boundary 665, and at locus 617, is beneficially tangent to datum line 648. Tangent length LT' beneficially corresponds to the tangent length LT at locus 616, at boundary 665, and at locus 617. Length L' is less than, but may substantially correspond to length L at locus 616, at boundary 665, and at locus 617. However, tangent length LT' may substantially correspond to tangent length LT", and to tangent length LTα, and length L' may correspond to length L" and to length Lα, or length L' and tangent length LT' may correspond to length L" and tangent length LT", respectively. In any event, the tangent length LT at boundary 665, and at locus 617 beneficially correspond to each other. This arrangement advantageously provides an LFC ratio of, or about, 1:1, to reduce differential clamshell deflection of unitary die assembly 600.

Referring in particular to mold 610 of FIG. 19, for ease of understanding, identical reference numerals indicate features of mold 610 associated with corresponding features of FIGS. 18 and 20. Furthermore, with flow channel 604 being symmetrical about the centerline of width W, like symmetrical features have been indicated with identical reference numerals. Boundary curve 665 delineates a diminishing cross-section manifold portion including transition zone section β, and a constant manifold cross-section manifold portion including transition zone section α. As illustrated, transition surface portions 640β,642β, are non-planar generally transverse to the manifold width, however, may be planar; and transition surface portions 640α,642α are planar. Varying included angle β may increment or decrement linearly or non-linearly between region 615, including between the midline of the manifold width, and boundary 665.

Referring to FIGS. 18 to 20, downstream flow channel portion 606 has an upstream boundary curve 633 (best seen in FIG. 19) formed by the intersection of manifold surface 640 with downstream channel surface 662 transversely along width W of flow channel 604, and has an opposing upstream boundary curve 634 (best seen in FIG. 18). Boundary curve 633 includes termini 641', 641", 641α. Boundary 633, and opposing boundary 634, which is formed by the intersection of manifold surface 642 with downstream channel surface 663 along width W of flow channel 604, form a boundary common to manifold 605 and flow channel portion 606. Boundary curve 634 includes termini 643', 643", 643α.

A boundary curve 635 (shown in phantom in FIG. 19) is defined, transversely from the centerline of flow channel width W, by vertices of varying angle β and constant angle α, including vertices 621', 621", 621α, along width W of flow channel 604. Transverse flow prescription zone 607 of flow channel portion 606 has an upstream boundary conveniently spaced apart from boundary curve 633, and generally parallel to an exit edge 618, and has a downstream boundary 637 (shown in phantom in FIG. 19) generally parallel to exit edge 618 and tangent to a locus 627 of flow channel 604.

As illustrated, curvilinear boundary curve 635 is oblique to rectilinear boundaries 633,634. Boundary curves 633,634 are generally parallel to an exit edge 618. Depending on the parameters selected to establish the manifold cross-sectional geometry corresponding to transition zone section β, rectilinear boundaries 633,634 may be curvilinear, and curvilinear boundary curve 635 may be rectilinear, transversely between a centerline of flow channel W and boundary curve 665.

With reference to the manifold portion comprising transition zone section α, boundary curves 633,634 are beneficially rectilinear, and upstream flow channel boundary curve 622 is beneficially parallel to boundary curves 633, 634, as beneficially suitable for receiving transversely slidable deckle member 619. Corresponding to manifold transition zone section β, upstream flow channel boundary curve 622 may be parallel, or substantially parallel, to boundary curve 633, and to exit orifice 628.

Consistent with the previous embodiments, Tables 1,1a and 2,2a provide, by way of example, a matrix of geometric parameters that may be used to define the cross-sectional shapes of a manifold including a generally teardrop cross-section, a generally extended cross-section, and cross-over cross-sections, provided that a portion of the manifold comprises a varying included angle in accordance with the present invention. In the present invention, a varying cross-sectional shape may be defined transversely between the midline of the manifold width and a boundary such as boundary 665 that delineates a varying included angle manifold portion from a constant included angle manifold portion; and a constant included angle manifold portion may be defined independently therefrom, from a boundary such as boundary 665 to an end of the manifold width or to another appropriate manifold boundary.

Geometric parameters may be used to define boundaries including boundary curves 622, 633, 634 and 635, and including back wall boundary curve 612 related to the relationship between fillet radii R, as well as the oblique or parallel relationship of boundaries, including of opposing boundaries to one another, and to an exit edge 618. The changes in manifold cross-sectional geometry may be selected or derived transversely along the width of manifold 605, between the manifold midline and boundary 665, and an end of the manifold width, and the changes may be linear or non-linear along the manifold width as appropriate.

With continuing reference to FIGS. 18 to 20, transverse flow-providing manifold 605 beneficially comprises between the manifold midline and locus 616, and boundary 665, a decreasing tangent height $H_T$, a decreasing height H, and decreasing fillet radii R, and a varying angle $\beta$ consistent with a constant tangent length $L_T$ and substantially constant length L. Consistent with a diminishing manifold cross-sectional area, varying angle $\beta$ advantageously provides an increased mass flow exchange rate through the manifold. In die 600, the varying included angle $\beta$ advantageously changes consistent with effecting a constant, or substantially constant, tangent length $L_T$, and consistent with a changing manifold cross-sectional area of manifold portion 605$\beta$ comprising transition zone section $\beta$, between region 615 and a boundary 665.

Geometric parameters that may affect the varying included angle $\beta$, may include a constant tangent length $L_T$, a changing height H, a changing or constant tangent height $H_T$, a changing length L, and a changing or constant fillet radius R, and combinations thereof. Reference can be made to the description of the fifth embodiment with respect to geometric parameter variations associated with a constant, or substantially constant, tangent length $L_T$; and like the fifth embodiment, this embodiment may in the alternative, comprise a crossover type manifold relative to manifold portion 605$\beta$ including varying angle $\beta$. Included angle $\alpha$ is a constant angle beneficially suitable for receiving transversely sliding internal deckle member 619. Beneficially, upstream flow channel boundary 622 is generally parallel to boundary curves 633, 634, and to exit orifice 628.

An internal deckle 619 is disposed in flow channel 604, including manifold 605. Beneficially, the close sliding fit relationship of the deckle minimizes deleterious accumulation of polymer between the deckle and flow channel. End 623 of deckle member 619 is proximate to, or at, locus 617 substantially ending transverse flow of the stream line related to locus 614. As deckle 619 is traversed in the direction of region 615, stream line locus 617 correspondingly moves closer to region 615; and as the deckle is traversed away from region 615, stream line locus 617 correspondingly moves further away from region 615. Likewise, as deckle 619 is traversed in or out, stream line locus 616 also moves relative to region 615. A useful deckle assembly may be of single or multiple component construction.

Geometric parameter variations associated with manifold portion 605$\beta$ comprising varying included angle $\beta$ and a constant, or substantially constant, tangent length $L_T$, may include a changing length L, related to change of the varying included angle; a changing tangent height $H_T$, and the varying included angle may change related to the changing tangent height $H_T$; a changing height H, and the varying angle may change related to the changing height H; a changing fillet radius R, and the varying included angle may change related to the changing fillet radius R; and combinations thereof.

In general accordance with the foregoing, a structurally beneficial $L_{FC}$ ratio of, or about, 1:1 advantageously provides reduced differential clamshell deflection. Lengths L', L" may correspond to each other, and tangent lengths $L_T'$, $L_T''$ may be different from each other, as selected or determined for geometrical objectives, and without unfavorably affecting the $L_{FC}$ ratio, or deleteriously affecting the mass flow exchange rate through the manifold.

Related to manifold portion 605$\beta$, geometric parameter variations associated with the decreasing manifold cross-sectional area and a constant, or substantially constant, tangent length $L_T$ include a changing length L, related to change of the varying included angle; a changing tangent height $H_T$, and the varying included angle may change related to the changing tangent height $H_T$; a changing height H, and the varying angle may change related to the changing height H; a changing fillet radius R, and the varying included angle may change related to the changing fillet radius R; and combinations thereof.

Change of the varying included angle of manifold portion 605$\beta$ with respect to a changing manifold cross-section is beneficially related to change of the manifold transition zone. The change of the varying included angle may be a linear or a non-linear change transversely between region 615, including between the manifold midline, and locus 616, and boundary 665. The varying included angle may decrease toward boundary 665, and at least one of the opposing transition surfaces of the manifold transition zone may increase in length in the main flow direction. Also related to change of the transition zone, the manifold may change transversely between region 615, including between the manifold midline, and locus 616, and boundary 665, and tangent length $L_T$ may remain constant or substantially constant across the manifold width. Benefits of a changing manifold cross-section portion associated with the inventive varying included angle include reduced transition stagnation, reduced manifold residence time, and reduction in differential clamshell deflection.

The manifold portion including varying angle $\beta$ may have a decreasing cross-sectional area having a constant, or substantially constant, length L, and the changing transition zone includes angle $\beta_1$ and angle $\beta_2$ that are related to a substantially constant, or constant, length L; or the manifold may have a decreasing cross-sectional area having a constant, or substantially constant, tangent length $L_T$, and the changing transition zone includes angle $\beta_1$ and angle $\beta_2$ that are advantageously consistent with a constant, or substantially constant, tangent length $L_T$. Angle $\beta_1$ and angle $\beta_2$ of the varying transition zone are beneficially consistent with tangent length $L_T'$ and corresponding tangent lengths $L_T''$, $L_T\alpha$, and related lengths L', L", and L$\alpha$. In this arrangement, a structurally beneficial $L_{FC}$ ratio of 1:1 advantageously provides reduced differential clamshell deflection. Accordingly, lengths L', L" may correspond to each other, and tangent lengths $L_T'$, $L_T''$ may be different from each other, as selected or determined for geometrical objectives, and without unfavorably affecting the $L_{FC}$ ratio, or deleteriously affecting the exchange rate of the mass flowing through manifold 605, including the manifold portions including varying angle $\beta$ and constant angle $\alpha$.

Beneficially, geometric parameters $L_T''$ and $L_T\alpha$, L" and L$\alpha$, H" and H$\alpha$, $H_T''$ and $H_T\alpha$, angle $\beta_2$ and angle $\alpha$, and fillet radii R" and R$\alpha$ correspond to each other to provide a streamlined boundary 665. Additionally, transverse flow restriction zone 607 advantageously provides for prescription of the transverse flow distribution from the midline of manifold 605 to a locus substantially ending transverse flow, including locus 617, within manifold 605, including within manifold portion 605α; an advantage unobtainable with a gull-wing type manifold.

Benefits associated with this embodiment are independent of the specific locations of selected loci, or of a boundary such as boundary 665 that delineates a varying included angle manifold portion from a constant included angle manifold portion. Thus, these features have been selected to assist, by way of example, understanding of the invention.

Beneficially, the varying included angle changes between the midline of the manifold width and a boundary such as boundary 665, and transition angle α is constant, and tangent lengths $L_T'$, $L_T''$, and $L_T\alpha$ may remain constant, or substantially constant, from the boundary to an end of the manifold. Benefits associated with this embodiment are independent of the selected manifold cross-section shape, including a generally teardrop cross-section, a generally extended manifold cross-section, or cross-over cross-sections, so long as a portion of the manifold comprises a varying included angle in accordance with the present invention.

To provide an $L_{FC}$ ratio of, or about, 1:1, an extrusion die in accordance with this embodiment beneficially comprises 1) a decreasing manifold cross-sectional area from region 615, including from the manifold midline, to boundary 665, 2) the decreasing cross-sectional area manifold portion comprising a transition zone comprising a varying included angle β corresponding to a constant, or substantially constant, tangent length $L_T$, 3) a constant cross-sectional area manifold portion having a constant included transition angle α, and a constant tangent height $H_T$, suitable for receiving a close fitting internal deckle, and 4) the decreasing manifold cross-section portion and the constant manifold cross-section portion correspond to the $L_{FC}$ ratio across flow channel width W.

In addition, an extrusion die comprising a manifold including a diminishing cross-sectional area portion and a constant cross-sectional area portion, and providing a $L_{FC}$ ratio of, or about, 1:1, consistent with the description of this embodiment, provides an increase in the mass flow exchange rate through the manifold and less differential clamshell deflection as compared to the prior art.

As will be apparent to a skilled artisan, features described in this embodiment, including the combination of a changing cross-sectional area portion related to a varying including angle, and a constant cross-sectional area portion, can be applied to embodiments corresponding to FIGS. 3-17. Thus, various modifications and combinations have been described. The present invention may be carried out with other modifications and/or combinations without departing from the spirit or essential attributes thereof. Accordingly, reference should be made to the appended claims as indicating the scope of the invention.

The invention claimed is:

1. An extrusion die comprising a flow channel providing fluid communication from a flow channel entrance to a flow channel exit orifice, wherein said flow channel comprises a transverse flow-providing manifold, and a downstream channel portion including said exit orifice, and wherein said manifold spans a width;

wherein along the manifold width, said manifold comprises opposing transition surfaces having an angular relationship to each other and forming a transition zone, wherein said opposing transition surfaces intersect surfaces of said downstream channel portion; and wherein along a portion of said manifold width, said transition zone comprises a varying included angle, and the manifold cross-section changes related to change of said varying included angle, and said manifold comprises a constant geometric parameter selected from a constant tangent length, a constant length, a constant height, a constant tangent height, and combinations thereof.

2. The extrusion die of claim 1, wherein said transition zone comprises said varying included angle between a midline of the manifold width and a locus substantially ending transverse flow within said manifold.

3. The extrusion die of claim 2, wherein said varying included angle changes between a first flow stream line and a second flow stream line, wherein said second flow stream line substantially ends transverse flow at said locus.

4. The extrusion die of claim 3, wherein said first flow stream line and said second flow stream line are separated by a third flow stream line.

5. The extrusion die of claim 2, wherein said locus substantially ending transverse flow is between said midline and an end region of said manifold.

6. The extrusion die of claim 2, wherein an end region of said manifold comprises said locus substantially ending transverse flow.

7. The extrusion die of claim 2, wherein said locus is between said midline and a locus terminating transverse flow within said manifold.

8. The extrusion die of claim 1, wherein at least one of said opposing transition surfaces is non-planar related to said varying included angle.

9. The extrusion die of claim 1, wherein along said portion of said manifold width, said manifold comprises a fillet radius.

10. The extrusion die of claim 1, wherein said change of said varying included angle is related to decrease of the manifold cross-sectional area.

11. The extrusion die of claim 10, wherein increase of said varying included angle is related to said decrease of the manifold cross-sectional area.

12. The extrusion die of claim 1, wherein said change of said varying included angle is selected from a linear change and a nonlinear change.

13. The extrusion die of claim 1, wherein said change of said varying included angle is further related to a changing geometric parameter selected from (a) manifold height, tangent height, length, and combinations thereof, and said constant geometric parameter is tangent length, or (b) manifold height, tangent height, tangent length, and combinations thereof, and said constant geometric parameter is length, or (c) manifold tangent height, length, tangent length, and combinations thereof, and said constant geometric parameter is height, or (d) manifold height, length, tangent length, and combinations thereof, and said constant geometric parameter is tangent height.

14. The extrusion die of claim 9, wherein said fillet radius is a varying fillet radius that changes along said portion of said manifold width.

15. The extrusion die of claim 1, wherein said varying included angle decreases, and at least one of said opposing transition surfaces increases in length.

16. The extrusion die of claim 13, wherein said manifold changes related to change of said transition zone, from a first generally extended cross-sectional shape further comprising a first extended length to a second generally extended cross-sectional shape further comprising a second extended length shorter than said first extended length.

17. The extrusion die of claim 14, wherein said change of said varying included angle is further related to a changing geometric parameter selected from
  (a) manifold height, tangent height, length, extended length, fillet radius, and combinations thereof, and said constant geometric parameter is tangent length, or
  (b) manifold height, tangent height, tangent length, fillet radius and combinations thereof, and said constant geometric parameter is length, or
  (c) manifold tangent height, length, tangent length, fillet radius, and combinations thereof, and said constant geometric parameter is height, or
  (d) manifold height, length, tangent length, fillet radius and combinations thereof, and said constant geometric parameter is tangent height.

18. The extrusion die of claim 9, wherein one of said opposing transition surfaces intersects said fillet radius.

19. The extrusion die of claim 1, wherein related to said change of said varying included angle, at least one of said opposing transition surfaces changes in length in the main flow direction, and wherein the change of transition surface length is selected from a linear change and a non-linear change.

20. The extrusion die of claim 1, wherein said varying included angle changes related to change of the manifold cross-sectional shape or area along said portion of said manifold width.

21. The extrusion die of claim 20, wherein said change of the manifold cross-sectional shape transforms said manifold from a generally extended shape to a generally tear drop shape.

22. The extrusion die of claim 21, wherein said varying included angle decreases, and at least one of said opposing transition surfaces of the generally tear drop cross-sectional shape is longer than one of said opposing transition surfaces of said generally extended shape.

23. The extrusion die of claim 13, wherein said varying included angle decreases, and at least one of said opposing transition surfaces changes in length in the main flow direction, and wherein the change of transition surface length is selected from a linear change and a non-linear change.

24. The extrusion die of claim 10, wherein decrease of said varying included angle is related to said decrease of the manifold cross-sectional area.

25. The extrusion die of claim 13, wherein said change of said varying included angle is related to change of the manifold cross-sectional shape or area.

26. The extrusion die of claim 13, wherein said manifold has a tangent height selected from a decreasing tangent height and said constant tangent height, and said varying included angle changes related to decrease of the manifold cross-sectional area.

27. The extrusion die of claim 26, wherein said transition zone comprises a relatively smaller first included angle related to a relatively longer manifold tangent length, and a relatively larger second included angle related to a relatively shorter manifold tangent length.

28. The extrusion die of claim 13, wherein said manifold has a height selected from a decreasing height and said constant height, and said varying included angle changes related to decrease of the manifold cross-sectional area.

29. The extrusion die of claim 1, wherein said manifold comprises said constant tangent height, and said change of said varying included angle is further related to changing manifold height, length, or tangent length, or to combinations thereof.

30. The extrusion die of claim 1, wherein said manifold comprises said constant height, and said change of said varying included angle is further related to changing manifold tangent height, length, or tangent length, or to combinations thereof.

31. The extrusion die of claim 30, wherein said transition zone comprises a relatively smaller first included angle related to a relatively longer manifold length, and a relatively larger second included angle related to a relatively shorter manifold length.

32. The extrusion die of claim 1, wherein said surfaces of said downstream channel portion form a transverse flow restriction gap, and are generally parallel, or oblique, to each other along said portion of said manifold width.

33. The extrusion die of claim 32, wherein said varying included angle changes related to change of said transverse flow restriction gap.

34. The extrusion die of claim 1, wherein said manifold comprises said constant length and a changing tangent length related to said change of said varying included angle.

35. The extrusion die of claim 1, wherein said manifold comprises said constant tangent length and a changing length related to said change of said varying included angle.

36. The extrusion die of claim 1, wherein said manifold comprises said constant length, and said change of said varying included angle is further related to changing manifold height or tangent height or to a combination thereof.

37. The extrusion die of claim 1, wherein said manifold comprises said constant tangent length, and said change of said varying included angle is further related to changing manifold height or tangent height or to a combination thereof.

38. The extrusion die of claim 14, wherein said manifold comprises said constant tangent height, and said change of said varying included angle is further related to changing manifold height.

39. The extrusion die of claim 14, wherein said change of said varying included angle is further related to said constant height or said constant tangent length.

40. The extrusion die of claim 14, wherein said change of said varying included angle is further related to said constant height or said constant length.

41. The extrusion die of claim 1, wherein said downstream channel portion further comprises an exit edge; and wherein along the manifold width, a common boundary curve is defined by a plurality of termini, and a second boundary curve is defined by a plurality of vertices of said varying included angle, and wherein a boundary curve selected from the common boundary curve and from the second boundary curve is parallel or generally parallel or oblique to said exit edge.

42. The extrusion die of claim 1, wherein said downstream channel portion further comprises a transverse flow restriction zone and an exit edge; and wherein along the manifold width, a boundary common to said manifold and to said downstream channel portion is parallel or generally parallel to the exit edge.

43. The extrusion die of claim 1, wherein along the manifold width, said downstream channel portion further comprises a transverse flow restriction zone designed to provide a prescribed mass flow distribution transverse to the main flow direction, and wherein said prescribed mass flow distribution is selected from a substantially uniform mass flow distribution and a non-uniform mass flow distribution.

44. The extrusion die of claim 43, wherein said transverse flow restriction zone is selected from a single stage flow restriction zone and a multi-stage flow restriction zone.

45. The extrusion die of claim 1, wherein said manifold is further defined by an upstream boundary curve and a downstream boundary curve wherein said downstream boundary curve is defined by a plurality of termini or by a plurality of vertices of said varying included angle, and said downstream boundary curve is parallel or generally parallel or oblique to said upstream boundary curve.

46. The extrusion die of claim 1, wherein said manifold comprises a generally teardrop-shaped cross-section.

47. The extrusion die of claim 1, wherein said manifold further comprises an extended surface.

48. The extrusion die of claim 1, wherein said varying included angle is an angle selected from the group consisting of an acute angle, a right angle, and an obtuse angle.

49. The extrusion die of claim 1, wherein an end region of said manifold comprises a locus terminating transverse flow.

50. The extrusion die of claim 1, wherein said varying included angle is related to the flow channel length.

51. The extrusion die of claim 1, wherein said manifold further comprises a manifold portion comprising a transition zone portion comprising a constant included angle, and wherein said transition zone comprising said varying included angle is coterminous with said transition zone portion comprising a constant included angle.

52. The extrusion die of claim 51, wherein said transition zone portion comprising a constant included angle, is adapted to receive an internal decide member.

53. The extrusion die of claim 52, wherein said decide member is slidably disposed in said manifold portion comprising a constant included angle, and wherein an end of the slidably disposed internal deckle provides an adjustable locus terminating transverse flow in said manifold.

54. An extrusion die comprising a flow channel providing fluid communication from a flow channel entrance to a flow channel exit orifice, wherein said flow channel comprises a multi-stage transverse flow-providing manifold, and a downstream channel portion including said exit orifice, and wherein said multi-stage manifold spans a width;
wherein along the manifold width, said multi-stage manifold comprises a first manifold portion comprising opposing transition surfaces having an angular relationship to each other and forming a transition zone comprising a varying included angle, and coterminous with said first manifold portion, a second manifold portion comprising opposing transition surfaces having an angular relationship to each other and forming a transition zone comprising a constant included angle.

55. The extrusion die of claim 54, wherein a coterminous manifold boundary delineates said first manifold portion from said second manifold portion.

56. The extrusion die of claim 55, wherein said transition zone comprising said varying included angle is between a midline of said manifold width and said coterminous manifold boundary.

57. The extrusion die of claim 54, wherein at least one of said opposing transition surfaces is non-planar along the width of said first manifold portion.

58. The extrusion die of claim 55, wherein between a midline of the manifold width and said coterminous manifold boundary, said varying included angle changes related to change of the manifold cross-sectional area.

59. The extrusion die of claim 58, wherein said varying included angle decreases and the manifold cross-sectional area decreases.

60. The extrusion die of claim 58, wherein said varying included angle increases and the manifold cross-sectional area decreases.

61. The extrusion die of claim 54, wherein change of said varying included angle is selected from a linear change and a nonlinear change.

62. The extrusion die of claim 55, wherein between a midline of the manifold width and said coterminous manifold boundary, said varying included angle changes related to transformation of said transition zone.

63. The extrusion die of claim 62, wherein change of said varying included angle is selected from a linear change and a nonlinear change.

64. The extrusion die of claim 62, wherein said varying included angle decreases, and at least one of said opposing transition surfaces increases in length.

65. The extrusion die of claim 62, wherein said first manifold portion changes related to said transformation of said transition zone, from a first generally extended cross-sectional shape further comprising a first extended length, to a second generally extended cross-sectional shape further comprising a second extended length shorter than said first extended length.

66. The extrusion die of claim 62, wherein said varying included angle changes related to a manifold length selected from a constant length and a substantially constant length.

67. The extrusion die of claim 62, wherein said varying included angle changes related to a tangent length selected from a constant tangent length and a substantially constant tangent length.

68. The extrusion die of claim 55, wherein between a midline of the manifold width and said coterminous manifold boundary, at least one of said opposing transition surfaces changes in length in the main flow direction, and wherein the change in length is selected from a linear change and a non-linear change.

69. The extrusion die of claim 55, wherein said varying included angle changes between a midline of the manifold width and said coterminous manifold boundary, related to transformation of said manifold from a first cross-sectional shape to a second cross-sectional shape.

70. The extrusion die of claim 69, wherein said transformation of said manifold is from a generally extended cross-sectional shape to a generally tear drop-shaped cross-section.

71. The extrusion die of claim 70, wherein said varying included angle decreases, and at least one of said opposing transition surfaces of said generally tear drop-shaped cross-section is longer than one of said opposing transition surfaces of said generally extended cross-sectional shape.

72. The extrusion die of claim 69, wherein said varying included angle decreases, and at least one of said opposing transition surfaces changes in length in the main flow direction, and wherein the change in length is selected from a linear change and a non-linear change.

73. The extrusion die of claim 69, wherein the change of said varying included angle is related to decrease of the manifold cross-sectional area.

74. The extrusion die of claim 69, wherein said first manifold portion has a tangent length selected from a constant tangent length and a substantially constant tangent length, and said transition zone comprises a relatively larger first included angle and a relatively smaller second included angle that are related to said tangent length.

75. The extrusion die of claim 55, wherein between a midline of said manifold width and said coterminous manifold boundary, said first manifold portion has a tangent height selected from a decreasing tangent height and a constant tangent height, and said varying included angle changes related to change of the manifold cross-sectional area.

76. The extrusion die of claim 75, wherein said transition zone comprises a relatively smaller first included angle related to a relatively longer manifold tangent length, and a relatively larger second included angle related to a relatively shorter manifold tangent length.

77. The extrusion die of claim 55, wherein between a midline of said manifold width and said coterminous manifold boundary, said manifold has a height selected from a decreasing height and a constant height, and said varying included angle changes related to change of the manifold cross-sectional area.

78. The extrusion die of claim 55, wherein between a midline of said manifold width and said coterminous manifold boundary, said manifold has a height selected from a decreasing height and a constant height.

79. The extrusion die of claim 55, wherein between a midline of said manifold width and said coterminous manifold boundary, said manifold has a constant tangent height and a changing height, and said varying included angle changes related to said changing height.

80. The extrusion die of claim 55, wherein said manifold has a constant tangent height and a decreasing cross-sectional area from a midline of said manifold width to said coterminous manifold boundary.

81. The extrusion die of claim 55, wherein between a midline of said manifold width and said coterminous manifold boundary, said manifold has a decreasing cross-sectional area comprising a manifold tangent length selected from a constant manifold tangent length and a substantially constant manifold tangent length related to said varying angle.

82. The extrusion die of claim 55, wherein between a midline of said manifold width and said coterminous manifold boundary, said manifold comprises a tangent length selected from a constant manifold tangent length and a substantially constant manifold tangent length, and said varying angle is related to said tangent length of said first manifold portion.

83. The extrusion die of claim 55, wherein between a midline of said manifold width and said coterminous manifold boundary, said manifold has a decreasing cross-sectional area comprising a manifold length selected from a constant manifold length and a substantially constant manifold length related to said varying angle.

84. The extrusion die of claim 55, wherein between a midline of said manifold width and said coterminous manifold boundary, said manifold comprises a length selected from a constant manifold length and a substantially constant manifold length, and said varying angle is related to said length of said first manifold portion.

85. The extrusion die of claim 55, wherein between a midline of said manifold width and said coterminous manifold boundary, said manifold comprises a varying fillet radius and a constant tangent length, and said varying included angle changes related to change of said fillet radius.

86. The extrusion die of claim 55, wherein between a midline of said manifold width and said coterminous manifold boundary, said manifold comprises a varying fillet radius, a changing tangent height, and a constant tangent length, and said varying included angle changes related to change of said fillet radius.

87. The extrusion die of claim 55, wherein said downstream channel portion further comprises a transverse flow restriction zone and an exit edge; and wherein between a midline of said manifold width and said coterminous manifold boundary, said varying included angle comprises a plurality of vertices that define a boundary, and said boundary defined by said vertices has a relationship to said exit edge selected from a generally parallel and oblique relationship.

88. The extrusion die of claim 54, wherein said downstream channel portion further comprises a transverse flow restriction zone and an exit edge; and wherein between a midline of said manifold width and an end of said manifold, the included angles of the transition zones of the first manifold portion and the second manifold portion comprise a plurality of vertices that define a boundary, and said boundary has a relationship to said exit edge selected from a generally parallel and oblique relationship.

89. The extrusion die of claim 55, wherein said downstream channel portion further comprises a transverse flow restriction zone; and wherein between a midline of said manifold width and said coterminous manifold boundary, a boundary common to said first manifold portion and to said downstream channel portion has a relationship related to an upstream boundary of said transverse flow restriction zone selected from an oblique and parallel relationship.

90. The extrusion die of claim 54, wherein said downstream channel portion further comprises a transverse flow restriction zone; and wherein between a midline of said manifold width and an end of said manifold, a boundary common to said manifold and to said downstream channel portion has a relationship related to an upstream boundary of said transverse flow restriction zone selected from an oblique and parallel relationship.

91. The extrusion die of claim 54, wherein said downstream channel portion further comprises a transverse flow restriction zone designed to provide a prescribed mass flow distribution transverse to the main flow direction, and wherein said prescribed mass flow distribution is selected from a substantially uniform mass flow distribution and a non-uniform mass flow distribution.

92. The extrusion die of claim 91, wherein said transverse flow restriction zone is selected from a single stage flow restriction zone and a multi-stage flow restriction zone.

93. The extrusion die of claim 54, wherein said downstream channel portion further comprises a transverse flow restriction zone comprising a dimensionally changing gap transverse to the main flow direction, and wherein said manifold has a tangent length along said manifold width selected from a constant tangent length and substantially constant tangent length, and said varying included angle changes related to said tangent length.

94. The extrusion die of claim 54, wherein said downstream channel portion further comprises a transverse flow restriction zone comprising a dimensionally changing gap transverse to the main flow direction, and wherein said manifold has a length along said manifold width selected from a constant length and a substantially constant length, and said varying included angle changes related to said length.

95. The extrusion die of claim 54, wherein said manifold comprises a generally teardrop-shaped cross-section.

96. The extrusion die of claim 54, wherein said manifold further comprises an extended surface.

97. The extrusion die of claim 55, wherein between a midline of said manifold width and said coterminous manifold boundary, said first manifold portion transforms from a generally extended cross-sectional shape to generally teardrop-shaped cross-section, and said varying included angle is related to said transformation.

98. The extrusion die of claim 55, wherein the cross-section of said first manifold portion coterminous with said coterminous manifold boundary, corresponds to the cross-section of said second manifold portion coterminous with said coterminous manifold boundary.

99. The extrusion die of claim 98, wherein said second manifold portion has a constant cross-section from said coterminous manifold boundary to an end of said manifold.

100. The extrusion die of claim 54, wherein said second manifold portion is adapted to receive an internal deckle member.

101. The extrusion die of claim 100, wherein said internal deckle member is disposed in said second manifold portion, and an end of said internal deckle member terminates transverse flow in said manifold.

102. The extrusion die of claim 100, wherein said internal deckle member is slidably disposed from an end of said manifold.

103. The extrusion die of claim 102, wherein an end of the slidably disposed internal deckle member is an adjustable boundary terminating transverse flow in said manifold.

104. The extrusion die of claim 54, wherein said flow channel is adapted to receive an internal deckle member.

105. The extrusion die of claim 104, wherein said internal deckle member is disposed in said flow channel, and an end of said internal decide member terminates transverse flow in said manifold.

106. The extrusion die of claim 104, wherein said internal decide member is slidably disposed from an end of said flow channel.

107. The extrusion die of claim 106, wherein an end of the slidably disposed internal deckle member is an adjustable boundary terminating transverse flow in said manifold.

108. The extrusion die of claim 54, wherein said varying included angle is an angle selected from the group consisting of an acute angle, a right angle, and an obtuse angle.

109. The extrusion die of claim 55, wherein between a midline of the manifold width and said coterminous manifold boundary, said varying included angle is related to the flow channel length.

110. The extrusion die of claim 109, wherein between the midline of said manifold width and said coterminous manifold boundary, said flow channel length is constant.

111. The extrusion die of claim 54, wherein along the flow channel width, the flow channel length is constant.

112. The extrusion die of claim 1, wherein said downstream channel portion further comprises a transverse flow restriction zone and an exit edge; and wherein along the manifold width, an upstream boundary of said transverse flow restriction zone is parallel or generally parallel to the exit edge.

113. The extrusion die of claim 1, wherein along said portion of the manifold width, a boundary curve defined by a plurality of termini, and a boundary curve defined by a plurality of vertices, are parallel or generally parallel or oblique to each other.

114. The extrusion die of claim 1, wherein said manifold comprises said constant tangent height, and said change of said varying included angle is further related to changing manifold height.

115. The extrusion die of claim 1, wherein said manifold comprises said constant tangent height, and said change of said varying included angle is further related to changing tangent length.

116. The extrusion die of claim 1, wherein said manifold comprises said constant tangent height, and said change of said varying included angle is further related to changing manifold length.

117. The extrusion die of claim 1, wherein said manifold comprises said constant height, and said change of said varying included angle is further related to changing tangent height.

118. The extrusion die of claim 1, wherein said manifold comprises said constant height, and said change of said varying included angle is further related to changing tangent length.

119. The extrusion die of claim 1, wherein said manifold comprises said constant height, and said change of said varying included angle is further related to changing manifold length.

120. The extrusion die of claim 1, wherein said manifold comprises said constant length, and said change of said varying included angle is further related to changing manifold height.

121. The extrusion die of claim 1, wherein said manifold comprises said constant length, and said change of said varying included angle is further related to changing tangent height.

122. The extrusion die of claim 1, wherein said manifold comprises said constant tangent length, and said change of said varying included angle is further related to changing tangent height.

123. The extrusion die of claim 1, wherein said manifold comprises said constant tangent length, and said change of said varying included angle is further related to changing manifold height.

124. An extrusion die comprising a flow channel having a width and a length, wherein said flow channel further comprises a transverse flow-providing manifold having a back line and a downstream channel portion including an exit orifice terminating in an exit edge;
  wherein along the flow channel width, said manifold comprises opposing transition surfaces having an angular relationship to each other and forming a transition zone, wherein one of said opposing transition surfaces intersects a surface of said downstream channel portion to form a common boundary curve; and
  wherein along a portion of said flow channel width, said transition zone comprises a varying included angle related to flow channel geometry, and said varying included angle prescribes a parallel or generally parallel relationship of said common boundary curve to said exit edge, or prescribes a flow channel length ratio of, or about 1:1 substantially along the flow channel width.

125. The extrusion die of claim 124, wherein said common boundary curve has a parallel or generally parallel relationship to the manifold back line.

126. The extrusion die of claim 124, wherein said downstream channel portion comprises a transverse flow restriction zone, and said common boundary curve is spaced apart from said transverse flow restriction zone.

127. The extrusion die of claim 124, wherein said manifold has a decreasing cross-sectional area related to said varying included angle.

128. The extrusion die of claim 124, wherein said varying included angle is related to change of the manifold cross-section from a shape having a first extended length at the midline of said manifold to a shape having a second extended length, and said second extended length is shorter than said first extended length.

129. The extrusion die of claim 128, wherein an increase of manifold length corresponds to the decrease of the extended length.

130. The extrusion die of claim 124, wherein said manifold comprises a substantially constant or constant tangent length.

131. The extrusion die of claim 124, wherein said downstream channel portion comprises a dimensionally changing transverse flow restriction gap.

132. The extrusion die of claim 131, wherein said manifold comprises a tangent length corresponding to said changing transverse flow restriction gap.

133. The extrusion die of claim 131, wherein the location of said common boundary curve changes corresponding to change of said changing transverse flow restriction gap.

134. The extrusion die of claim 124, wherein said varying included angle is related to the location of said common boundary curve.

* * * * *